United States Patent
Kim

(10) Patent No.: US 11,551,468 B2
(45) Date of Patent: Jan. 10, 2023

(54) INPUT SENSING DEVICE AND CALIBRATION METHOD OF INPUT SENSING DEVICE

(71) Applicant: SAMSUNG DISPLAY CO., LTD., Yongin-si (KR)

(72) Inventor: Kee Yong Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/365,050

(22) Filed: Jul. 1, 2021

(65) Prior Publication Data

US 2022/0147730 A1    May 12, 2022

(30) Foreign Application Priority Data

Nov. 6, 2020    (KR) .................. 10-2020-0148088

(51) Int. Cl.
   *G06V 40/13*    (2022.01)
   *H04N 5/235*    (2006.01)
   *G06V 40/12*    (2022.01)

(52) U.S. Cl.
   CPC ...... *G06V 40/1318* (2022.01); *G06V 40/1365* (2022.01); *H04N 5/2353* (2013.01)

(58) Field of Classification Search
   None
   See application file for complete search history.

(56) References Cited

U.S. PATENT DOCUMENTS

2020/0394380 A1* 12/2020 Chung ............... G06V 40/1318
2022/0019757 A1*  1/2022 Han .................. H01L 27/323

FOREIGN PATENT DOCUMENTS

| KR | 10-1923335 | 2/2019 |
| WO | 2017076292 | 5/2017 |

* cited by examiner

*Primary Examiner* — Joseph R Haley
(74) *Attorney, Agent, or Firm* — F. Chau & Associates, LLC

(57) ABSTRACT

An input sensing device includes a display panel, a sensor pixel, and a fingerprint detector. The display panel displays a fingerprint detection pattern corresponding to a target object. The sensor pixel generates a sensing signal by detecting light reflected from the fingerprint detection pattern by the target object. The fingerprint detector detects a fingerprint for the target object based on the sensing signal, and changes an exposure time of the sensor pixel based on a size of the fingerprint detection pattern.

15 Claims, 14 Drawing Sheets

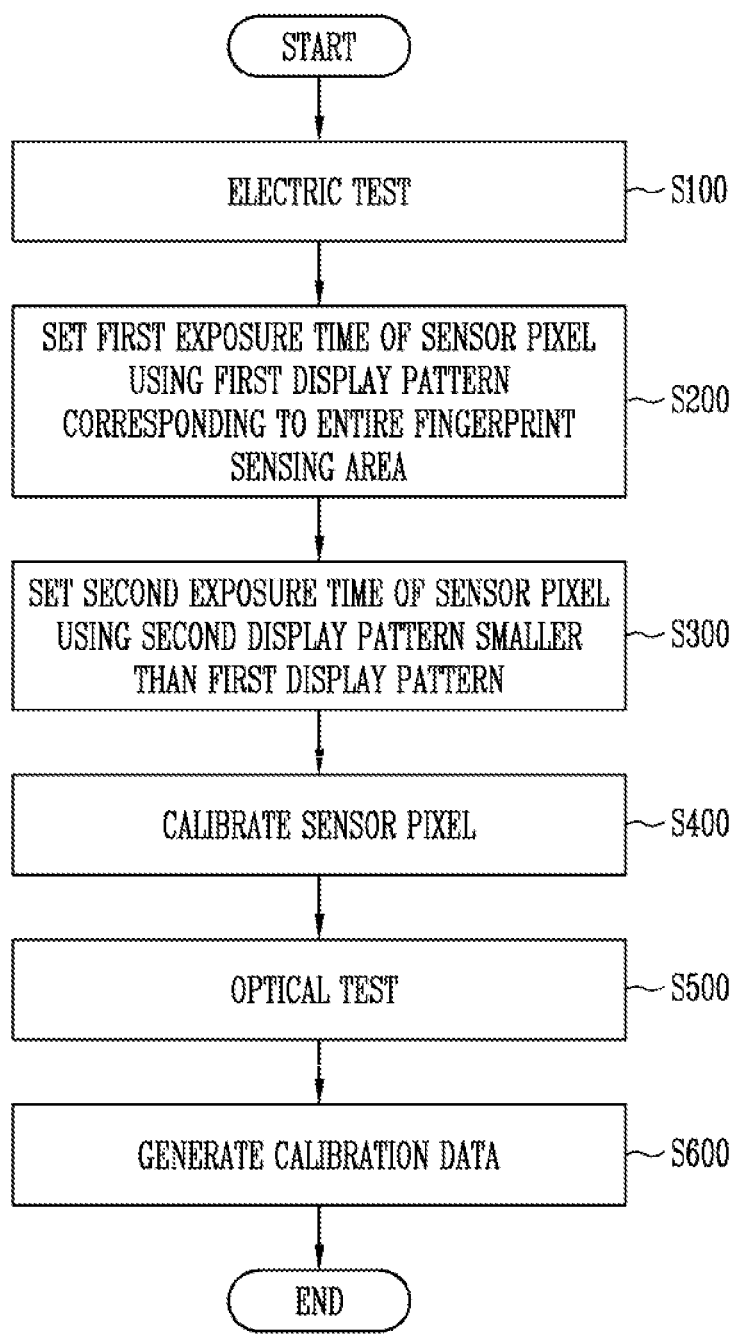

INPUT SENSING DEVICE AND CALIBRATION METHOD OF INPUT SENSING DEVICE

CROSS-REFERENCE TO RELATED APPLICATION

This application claims priority to and the benefit of Korean Patent Application No. 10-2020-0148088 filed in the Korean Intellectual Property Office on Nov. 6, 2020, the entire contents of which are herein incorporated by reference.

BACKGROUND

1. Field

One or more embodiments described herein relate to an input sensing device and a method of calibrating an input sensing device.

2. Description of the Related Art

Display devices have been developed to detect fingerprints for authentication purposes. Such devices include a fingerprint sensor configured, for example, as a photo-sensitive sensor. In some cases, a photo-sensitive fingerprint sensor may use a light emitting element of a pixel as a light source. Some fingerprint sensors include a photo sensor array. One example is a complementary metal oxide semiconductor (CMOS) image sensor (CIS).

As the size of a fingerprint sensor becomes larger, a user may use only a partial area of the sensor. When only a partial area of the sensor is driven, the condition under which the sensor is used is different from a calibration condition for the fingerprint sensor, which, for example, is performed based on the entire area of the sensor. Hence, calibration performance for the fingerprint sensor may deteriorate, as a result a fingerprint may not be accurately detected.

SUMMARY OF THE INVENTION

One or more embodiments described herein provide an input sensing device capable of accurately detecting a fingerprint under a variety of conditions, including when only a partial area of the senor is used.

One or more embodiments provide a method of calibrating the aforementioned input sensing device in a way that improves performance of fingerprint detection, even when only a partial area of the sensor is used.

In accordance with one or more embodiments, an input sensing device includes a display panel configured to display a fingerprint detection pattern corresponding to a target object; a sensor pixel configured to generate a sensing signal by detecting light reflected from the fingerprint detection pattern by the target object; and a fingerprint detector configured to detect a fingerprint for the target object based on the sensing signal, wherein the fingerprint detector is configured to change an exposure time of the sensor pixel based on a size of the fingerprint detection pattern.

In accordance with one or more embodiments, a method of calibrating an input sensing device includes setting an exposure time of a sensor pixel in a display panel based on light reflected from fingerprint detection patterns having different sizes, the display panel displaying the fingerprint detection patterns and the sensor pixel senses light reflected from the fingerprint detection patterns.

In accordance with one or more an apparatus includes a fingerprint sensor including a sensor pixel and a controller to control driving of the sensor pixel, wherein the controller is configured to set a first exposure time for the sensor pixel based on a first fingerprint detection pattern and a second exposure time for the sensor pixel based on a second fingerprint detection pattern different from the first fingerprint detection pattern.

However, the effects of the embodiments are not limited to the above-described effects, and may be modified in various ways as without departing from the spirit and scope of the subject matter disclosed herein.

BRIEF DESCRIPTION OF THE DRAWINGS

FIG. 12 illustrates an embodiment of a calibration method of an input sensing device.

DETAILED DESCRIPTION OF THE EMBODIMENTS

Figure 1A:
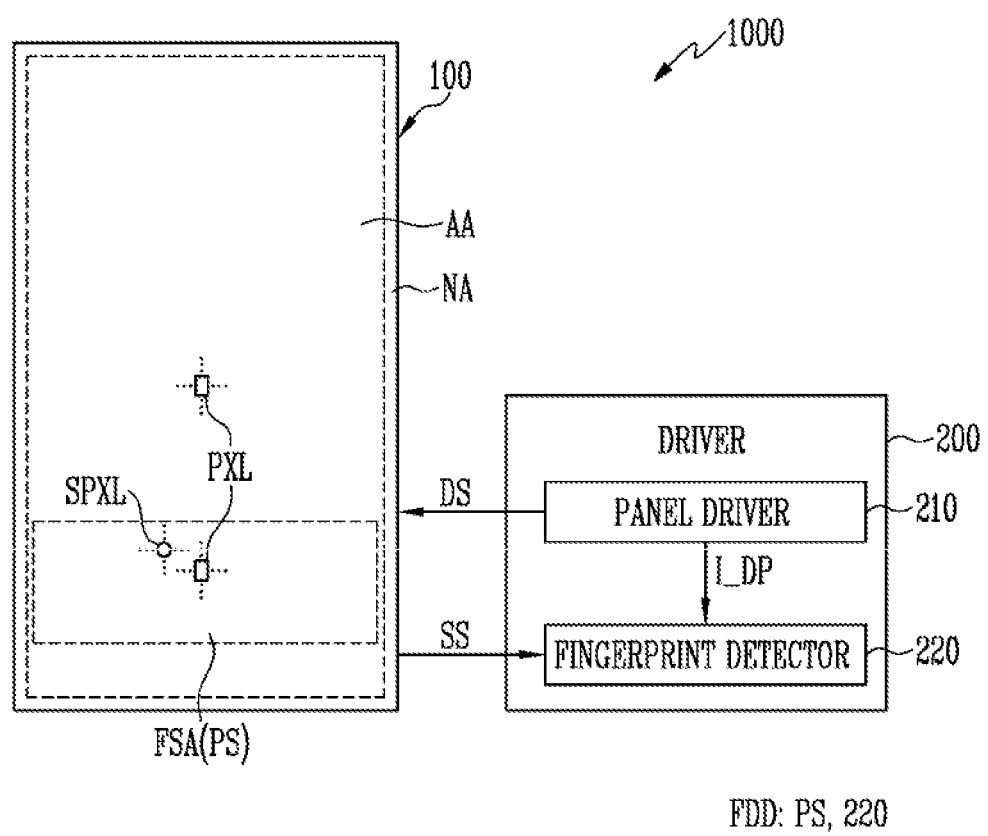
FIGS. 1A and 1B illustrate embodiments of a display device.

Hereinafter, embodiments of the present invention will be described in detail with reference to the accompanying drawings so that the present invention may be easily carried out by those of ordinary skill in the art. The present invention may be embodied in many different forms and is not limited to the embodiments of the present invention described herein.

To clearly describe the present invention, parts having no relation to the description are omitted, and like reference numerals are assigned to like elements throughout the specification. Therefore, the reference numerals described above may also be used in other drawings.

In addition, since sizes and thicknesses of elements in the drawings are arbitrarily illustrated for convenience of explanation, the present invention is not limited thereto. In the drawings, the thickness may be exaggerated to clearly express various layers and regions.

Figure 1B:
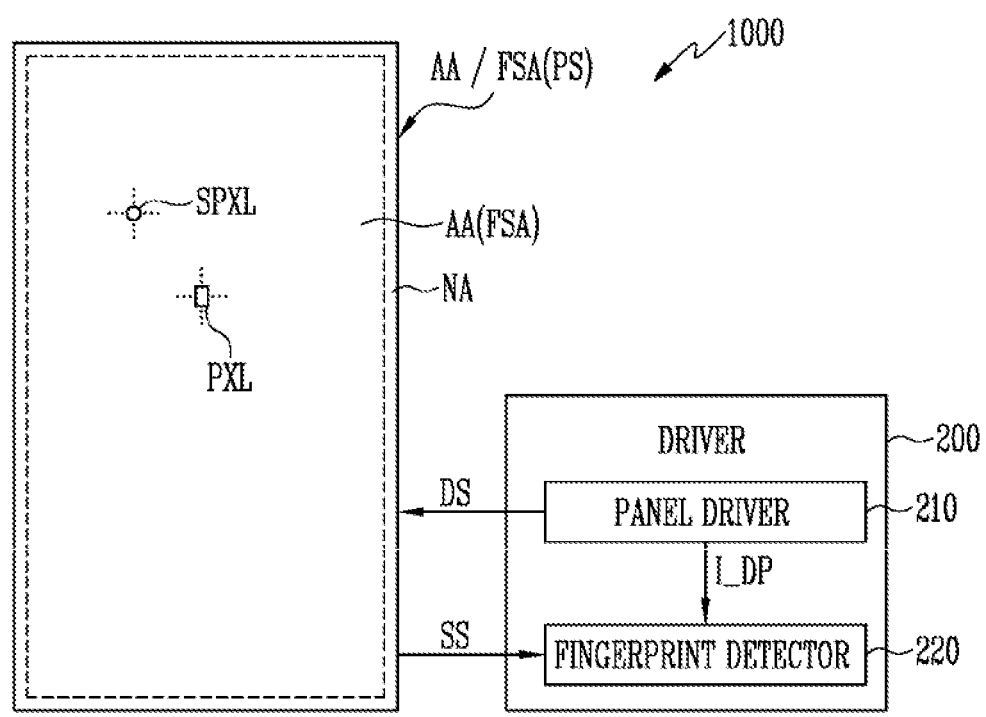

FIG. 1A is a block diagram schematically illustrating an embodiment of a display device 1000, and FIG. 1B is a block diagram schematically illustrating an embodiment of the display device 1000 of FIG. 1A. For convenience, in FIGS. 1A and 1B, a display panel 100 and a driver 200 are separately illustrated, but the embodiments are not limited thereto. For example, all or part of the driver 200 may be integrally implemented on the display panel 100.

Referring to FIGS. 1A and 1B, the display device 1000 (or an input sensing device) may include a display panel 100 and a driver 200. The driver 200 may include a panel driver 210 and a fingerprint detector 220 (or an input detector). All or at least part of the display device 1000 may have flexibility.

The display panel 100 may include a display area AA and a non-display area NA. The display area AA includes a plurality of pixels PXL (which may be referred to as subpixels) and thus may be referred to as an active area. Each of the pixels PXL may include at least one light emitting element. The display device 1000 displays an image on the display area AA by driving the pixels PXL according to image data input from an external source.

In an embodiment, the display area AA may include a fingerprint sensing area FSA (or an input sensing area). The fingerprint sensing area FSA may include at least some pixels PXL provided in the display area AA.

In an embodiment, as illustrated in FIG. 1A, at least part of the display area AA may be set as the fingerprint sensing area FSA. In one embodiment, as illustrated in FIG. 1B, the entire or most of the display area AA may be set as the fingerprint sensing area FSA. When fingerprint detection is performed, a fingerprint detection operation may be performed only in a portion at which a user touch is actually received.

Although FIG. 1A illustrates an example in which only one fingerprint sensing area FSA is formed on the display area AA, the embodiments are not limited thereto. For example, a plurality of regularly or irregularly arranged fingerprint sensing areas FSA may be formed on the display area AA. In addition, although FIGS. 1A and 1B illustrate examples in which the fingerprint sensing area FSA is formed on at least part of the display area AA, the embodiments are not limited thereto. For example, in various embodiments, the display area AA and the fingerprint sensing area FSA may overlap in only a partial area.

The non-display area NA may be around the display area AA and may be referred to as a non-active area. For example, the non-display area NA may include a line area, a pad area, and various dummy areas.

In an embodiment, the display device 1000 may further include a plurality of sensor pixels SPXL in the fingerprint sensing area FSA. Each of the sensor pixels SPXL may include, for example, a photo sensor PS for detecting light. In an embodiment, when light emitted from the light source (or pixel PXL) in the display device 1000 is reflected by a target object (e.g., a finger), one or more of the sensor pixels SPXL may detect the reflected light and output a corresponding electric signal (e.g., a voltage signal). The electric signal may be transmitted to the driver 200 (e.g., the fingerprint detector 220) and may be used for fingerprint detection. A case in which the sensor pixels SPXL are used for fingerprint detection will be described as an example. However, in some embodiments, the sensor pixels SPXL may be used for performing various functions such as a touch sensor and/or a scanner.

When the sensor pixels SPXL are in the fingerprint sensing area FSA in a plan view, the sensor pixels SPXL may overlap or be around the pixels PXL. For example, all or some or the sensor pixels SPXL may overlap the pixels PXL or may be between the pixels PXL. In various embodiments, the sensor pixels SPXL and the pixels PXL may have the same or different sizes. The relative size and/or arrangement between the sensor pixels SPXL and the pixels PXL may vary among embodiments.

When the sensor pixels SPXL are adjacent to the pixels PXL or overlap at least some pixels PXL, the sensor pixels SPXL may use a light emitting element in the pixel PXL as a light source. In these embodiments, the sensor pixels SPXL may constitute a photo-sensitive fingerprint sensor (or a photo sensor PS) together with light emitting elements in the pixels PXL. In this manner, when a fingerprint sensor-embedded display device is configured using the pixels PXL as the light source (e.g., without using a separate external light source), the module thickness of the photo-sensitive fingerprint sensor (that is, the photo sensor PS) and the display device 1000 including the same may be reduced, which, in turn, may reduce manufacturing costs.

In various embodiments, the sensor pixels SPXL may be on another surface (e.g., rear surface) opposite to a surface (e.g., front surface) on which an image is displayed between both surfaces of the display panel 100. However, the embodiments are not limited thereto.

The driver 200 may drive the display panel 100. For example, the driver 200 may output a data signal DS corresponding to image data to the display panel 100. In addition, the driver 200 may output a driving signal for the sensor pixels SPXL and receive electric signals (e.g., sensing signals SS) received from the sensor pixels SPXL. The driver 200 may detect the type of the fingerprint of the user by using electric signals and detect a fake fingerprint.

In various embodiments, the driver 200 may include a panel driver 210 and a fingerprint detector 220. Although FIGS. 1A and 1B separately illustrate the panel driver 210 and the fingerprint detector 220, in another embodiment at least a portion of the fingerprint detector 220 may be integrated with the panel driver 210 or may interoperate with the panel driver 210.

The panel driver 210 may supply the data signal DS corresponding to the image data to the pixels PXL, while scanning (e.g., sequentially) the pixels PXL of the display area AA. The display panel 100 may display an image corresponding to the image data.

In an embodiment, the panel driver 210 may supply a driving signal for fingerprint detection to the pixels PXL. This driving signal may cause the pixels PXL to emit light and operate as the light source for the sensor pixels SPXL. In these embodiments, the driving signal for fingerprint detection may be provided to the pixels PXL in a specific area in the display panel 100 (e.g., the pixels PXLs in the fingerprint sensing area FSA or pixels PXLs corresponding to a portion in which a user touch is received). In this case, the display panel 100 may display a fingerprint detection pattern (or a display pattern, an image pattern, or a white image pattern having, for example, maximum luminance (or brightness)) for fingerprint detection in at least a partial area of the fingerprint sensing area FSA.

In an embodiment, the panel driver 210 may provide fingerprint detection pattern information I_DP to the fingerprint detector 220. The fingerprint detection pattern information I_DP may include area information (or size information) indicative of the size of the area in which the fingerprint detection pattern is displayed on the display panel 100. According to an embodiment, when the display device 1000 includes a touch sensor for sensing a user touch input, the panel driver 210 (or the touch detector for driving the touch sensor) may provide, to the fingerprint detector 220, the fingerprint detection pattern information I_DP including the area information (or the size information) about the area in which the user touch is input.

The fingerprint detector 220 may transmit the driving signal (e.g., the driving voltage) for driving the sensor pixels SPXL to the sensor pixels SPXL, and may detect a user fingerprint based on electric signals from the sensor pixels SPXL. For example, the fingerprint detector 220 may perform fingerprint authentication based on the sensing signal SS supplied from one or more of the sensor pixels SPXL (for example, the optical sensor PS). The photo sensor PS including the sensor pixels SPXL and the fingerprint detector 220 may constitute a fingerprint detection device FDD (or a fingerprint sensor).

In one or more embodiments, the fingerprint detector 220 may change a driving condition of one or more of the sensor pixels SPXL based on the fingerprint detection pattern information I_DP. For example, the fingerprint detector 220 may change the exposure time of the one or more sensor pixels SPXL based on the fingerprint detection pattern information I_DP. The exposure time may refer to not only the time when the sensor pixel SPXL receives the reflected light, but also the time when an electric signal corresponding to the reflected light is output from a sensor pixel SPXL. The magnitude of the electric signal received from the sensor pixel SPXL by the fingerprint detector 220 may change according to the exposure time.

The luminance of the fingerprint detection pattern may change according to the area (or size) of the fingerprint detection pattern (or area in which the touch input occurs) displayed on the display panel 100. (Examples are described with reference to FIGS. 7 and 8). Therefore, the intensity of the reflected light detected by the sensor pixel SPXL (or the response of the sensor pixel SPXL to the reflected light, e.g., sensing sensitivity) may change.

In some circumstances, a calibration value for a sensor pixel SPXL set under a specific condition (e.g., based on specific light intensity) may not be effective. The calibration value may be a preset value for calibrating a deviation in the amount of light received according to a process distribution and position of the sensor pixel SPXL, and, for example, may be a value for calibrating the sensing data generated based on the sensing signal SS of the sensor pixels SPXL. Therefore, by changing the exposure time of one or more sensor pixels SPXL based on the fingerprint detection pattern information I_DP, the fingerprint detector 220 may adjust the light intensity of the reflected light detected by the one or more sensor pixels SPXL (or the sensing sensitivity of the sensor pixel(s) SPXL) to be equal to specific light intensity, which may be a condition in which the calibration value can be effectively applied. Example embodiments of the configuration and operation of fingerprint detector 220 are described with reference to FIGS. 6 to 11B.

As described above, the display device 1000 (or input sensing device) may include the fingerprint detection device FDD, and the fingerprint detection device FDD may include the photo sensor PS and the fingerprint detector 220 on one surface of the display panel 100 and may use one or more pixels PX in the display panel 100 as a light source. In addition, the fingerprint detector 220 may change a driving condition (e.g., exposure time) of one or more of the sensor pixels SPXL based on the fingerprint detection pattern information I_DP from the panel driver 210 (or the touch detector), e.g., the area information or size information corresponding to the area in which the fingerprint detection pattern is displayed or the touch input has occurred. In this manner, the sensing signal SS supplied from the one or more sensor pixels SPXL may be in a state in which the calibration value may be effectively applied for calibrating deviation in the amount of light received according to a position of the one or more sensor pixels SPXL. Accordingly, a more accurate calibration may be performed for the sensing signal SS (or the sensing data corresponding thereto), which, in turn, may result in a more accurate detection of the fingerprint of a user.

Figure 2:
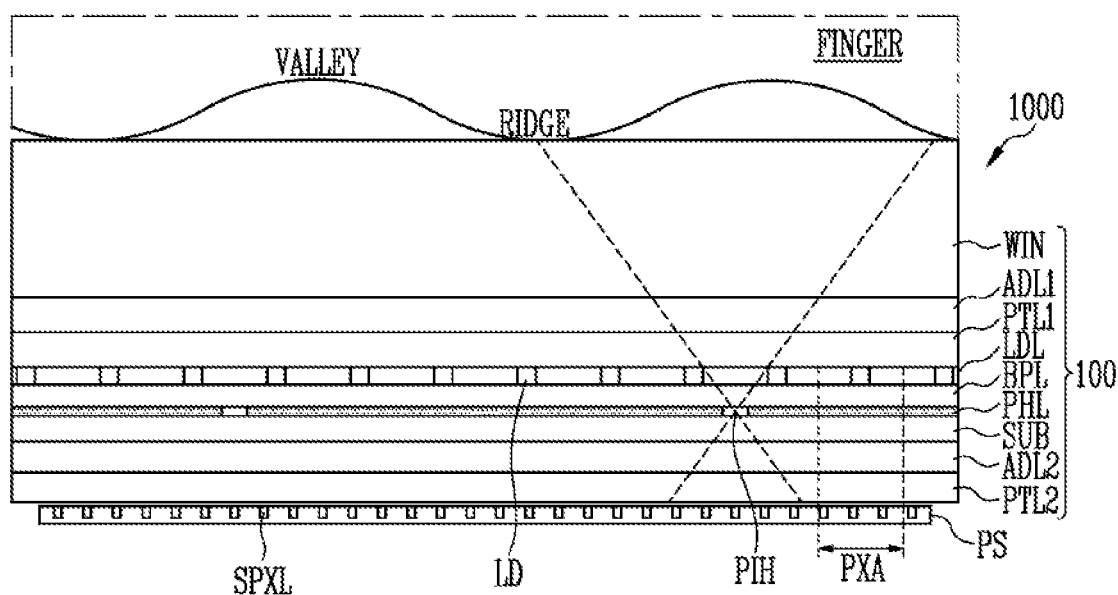
FIG. 2 illustrating a cross-sectional embodiment of a display device.

FIG. 2 is a cross-sectional view illustrating an embodiment of the display device, e.g., which may correspond to a cross-section in the fingerprint sensing area FSA of display device 1000 of FIGS. 1A and 1B.

Referring to FIGS. 1A through 2, the display device 1000 may include the display panel 100 in the fingerprint sensing area FSA, and the photo sensor PS disposed on one surface of the display panel 100. The display device 1000 may include a substrate SUB, a circuit element layer BPL, a light emitting element layer LDL, a first protective layer PTL1, a first adhesive layer ADL1, and a window WIN sequentially disposed on one surface (for example, upper surface) of the substrate SUB. In addition, the display device 1000 may include a second adhesive layer ADL2 and a second protective layer PTL2, sequentially disposed on another surface (e.g., lower surface) of substrate SUB in the sensing area SA.

The substrate SUB may be a base substrate of the display panel 100 and may be a substantially transparent light-transmitting substrate. The substrate SUB may be a rigid substrate including glass or tempered glass, or a flexible substrate including plastic. The material of the substrate SUB may be different in another embodiment.

The circuit element layer BPL may be on one surface of the substrate SUB and may include at least one conductive layer. For example, the circuit element layer BPL may include a plurality of circuit elements of the pixel circuit of the pixels PXL, and lines for supplying various powers and signals for driving the pixels PXL. The circuit element layer BPL may include various circuit elements such as, for example, at least one transistor and a capacitor and a plurality of conductive layers for constituting lines connected thereto. In addition, the circuit element layer BPL may include at least one insulating layer between the plurality of conductive layers.

The light emitting element layer LDL may be on one surface of the circuit element layer BPL. The light emitting element layer LDL may include a plurality of light emitting elements LD connected to the circuit elements and/or the lines of the circuit element layer BPL through contact holes or the like. In an embodiment, at least one light emitting element LD may be provided for each pixel PXL. Examples of the light emitting element LD include an organic light emitting diode, a micro light emitting diode, or an inorganic light emitting diode such as a quantum dot light emitting diode. In one embodiment, the light emitting element LD may include a combination of organic and inorganic materials. Furthermore, each of the pixels PXL may include a single light emitting element LD. In one embodiment, each of the pixels PXL may include a plurality of light emitting elements LD connected to each other in series, parallel, or series-parallel.

Each of the pixels PXL may include circuit elements in the circuit element layer BPL, and at least one light emitting element LD in the light emitting element layer LDL above the circuit element layer BPL.

The first protective layer PTL1 may be on the light emitting element layer LDL to cover the display area AA. The first protective layer PTL1 may include a sealing member (e.g., a thin film encapsulation (TFE) layer or an encapsulation substrate) and may further include a protective film.

The first adhesive layer ADL1 is between the first protective layer PTL1 and the window WIN to couple the first protective layer PTL1 to the window WIN. The first adhesive layer ADL1 may include a transparent adhesive such as an optically clear adhesive (OCA) and may include various adhesive materials.

The window WIN may be a protective member at an end (e.g., the uppermost end) of the module of the display device 1000 including the display panel 100, and may be a substantially transparent light-transmitting substrate. The window WIN may have a multilayer structure of a glass substrate, a plastic film, and/or a plastic substrate. The window WIN may include a rigid or flexible substrate, and the material constituting the window WIN may vary among embodiments.

In various embodiments, the display device 1000 may further include a polarizing plate, an anti-reflection layer, and/or a touch sensor layer (touch electrode layer). The display device 1000 may further include a polarizing plate and/or a touch sensor layer between the first protective layer PTL1 and the window WIN.

The touch sensor layer may include a plurality of sensing electrodes (or sensing cells). In this case, the driver 200 described with reference to FIG. 1A may detect the presence or absence of a touch input and the position (or coordinates, area, etc.) of the touch input based on a change in capacitance between the sensing electrodes.

The second protective layer PTL2 may be on the other surface of the substrate SUB and may be coupled to the substrate SUB by the second adhesive layer ADL2. The second adhesive layer ADL2 may firmly couple (or bond) the substrate SUB to the second protective layer PTL2. The second adhesive layer ADL2 may include a transparent adhesive such as an optically clear adhesive (OCA). The second adhesive layer ADL2 may include a pressure sensitive adhesive (PSA) in which an adhesive material acts when a pressure for bonding to the adhesive surface is applied.

The second protective layer PTL2 may prevent infiltration of oxygen and moisture from the outside and may include a single layer or multiple layers. The second protective layer PTL2 may be provided in a film form to further secure flexibility of the display panel 100. The second protective layer PTL2 may be coupled to the photo sensor PS through another adhesive layer including a transparent adhesive such as an OCA.

The photo sensor PS is bonded to the rear surface of the display panel 100 through an adhesive or the like to overlap at least one area of the display panel 100. The photo sensor PS may overlap the display panel 100 in, for example, the fingerprint sensing area FSA. The photo sensor PS may include a plurality of sensor pixels SPXL dispersed at a predetermined resolution and/or interval.

In an embodiment, an optical system may be disposed on the photo sensor PS to provide an optical path by condensing light directed to the photo sensor PS. The width of the light transmitting part that guides light in the optical system may be determined considering sensing precision and light conversion efficiency. Due to such an optical system, the condensing factor of light incident onto the photo sensor PS may be improved. According to an embodiment, the optical system may include an optical fiber, silicon, or the like.

The sensor pixels SPXL may have an appropriate number, size, and arrangement so that an identifiable fingerprint image may be generated from electric signals output from the sensor pixels SPXL. The spacings between the sensor pixels SPXL may be densely set (e.g., may correspond to a predetermined density or resolution) so that light reflected from the target object (e.g., the fingerprint) may be incident onto at least two adjacent sensor pixels SPXL.

The sensor pixels SPXL may sense external light and output a corresponding electric signals, for example, voltage signals. Reflected light received by each of the sensor pixels SPXL may have optical characteristics (e.g., frequency, wavelength, size, etc.) that include valleys and ridges of a fingerprint on a finger (or a patterns on a palm) or a dermatoglyphic pattern formed on the skin). Therefore, each of the sensor pixels SPXL may output a sensing signal SS having different electric characteristics in correspondence with the optical characteristics of the reflected light.

In an embodiment, the display device 1000 (or the display panel 100) may further include a light blocking layer PHL disposed inside the display panel 100 or between the display panel 100 and the sensor pixels SPXL to partially block light incident on the sensor pixels SPXL. For example, part of the light incident on the light blocking layer PHL may be blocked, and the remaining part may pass through pinholes PIH and reach the sensor pixels SPXL under the light blocking layer PHL. The pinholes PIH may operate as an optical system and may be used together with other optical systems.

The pinholes PIH may refer to optical holes and may be a type of light-transmitting hole. For example, the pinholes PIH may be light-transmitting holes having a predetermined or smallest size (or area), among the light-transmitting holes arranged to overlap the layers of the display device 1000 on a path through which reflected light passes through the display panel 100 in a diagonal or vertical direction and enters the sensor pixels SPXL.

The pinholes PIH may have a predetermined width, for example, a width w in a range of about 5 μm to 20 μm. In this manner, as the distance from the light blocking layer PHL is increased (e.g., toward the upper and lower directions of the light blocking layer PHL), the width of the optical opening area to be secured in each layer of the display device 1000 may increase gradually, e.g., at a predetermined rate below a reference level.

The width (or diameter) of the pinholes PIH may be set to be about 10 times or more of the wavelength of the reflected light, for example, about 4 μm or 5 μm or more, to prevent diffraction of light. In addition, the width of the pinholes PIH may be set to a size sufficient to prevent image blur and to detect the shape of a fingerprint more clearly. For example, the width of the pinholes PIH may be set to about 15 μm or less. In one or more embodiments, the width of the pinholes PIH may be determined, for example, according to the wavelength band of the reflected light and/or the thickness of each layer of the module.

Only reflected light that passes through the pinholes PIH may reach the sensor pixels SPXL of the photo sensor PS. The phases of light reflected from the fingerprint by the pinholes PIH may have a very narrow width and the phase of the image formed on the photo sensor PS may have a predetermined difference, e.g., about 180 degrees.

The sensor pixels SPXL may output a sensing signal SS corresponding to the received reflected light, for example, a voltage signal. An infrared cut-off filter may be disposed between the optical system (e.g., the light blocking layer PHL) and the photo sensor PS, or between the display panel 100 and the optical system. Although FIG. 2 illustrates an embodiment in which the light blocking layer PHL including the pinholes PIH is used as the optical system, other configurations are possible. For example, a micro lens type or collimator type optical system (or optical sensor) may be used.

Figure 3:
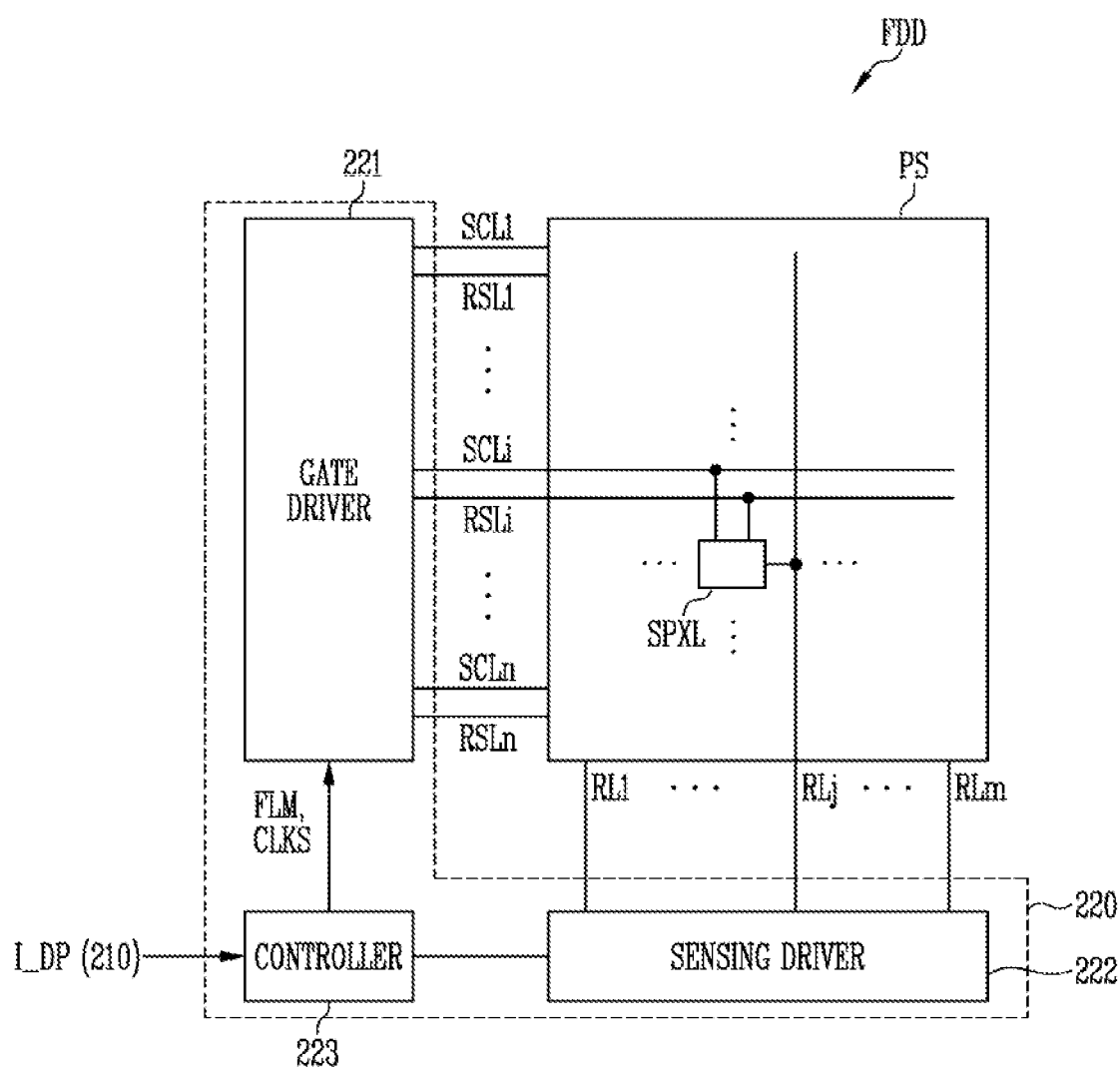
FIG. 3 illustrates an embodiment of a fingerprint detection device.

FIG. 3 is a block diagram illustrating an embodiment of fingerprint detection device FDD in the display device 1000 of FIGS. 1A and 1B.

Referring to FIGS. 1A to 3, the fingerprint detection device FDD may include the photo sensor PS and the fingerprint detector 220. The photo sensor PS may include an array of sensor pixels SPXL. In an embodiment, the sensor pixels SPXL may be arranged in a two-dimensional array, but a different configuration is possible in another embodiment. Each of the sensor pixels SPXL may include a photoelectric element that photoelectrically converts incident light to charge according to the amount of light.

The fingerprint detector 220 may include a gate driver 221 (or a horizontal driver), a sensing driver 222 (or a vertical driver), and a controller 223. The gate driver 221 may be formed together with the photo sensor PS on one substrate. The sensing driver 222 and the controller 223 may be implemented as one integrated circuit and may be connected to the photo sensor PS or the like, for example, through a flexible circuit board. Different configurations are possible in another embodiments.

The gate driver 221 may be connected to the sensor pixels SPXL through reset lines RSL1 to RSLn (where n is a positive integer). The gate driver 221 may include a shift register or an address decoder. In various embodiments, to initialize the sensor pixels SPXL (for example, to initialize or discharge photoelectrically converted charges charged in the sensor pixels SPXL), the gate driver 221 may apply the reset signals to one or more sensor pixels SPXL through the reset lines RSL1 to RSLn.

In an embodiment, the gate driver 221 may supply the reset signals to at least some reset lines RSL1 to RSLn based on a start signal FLM and clock signals CLKS from the controller 223 (e.g., a reset start signal and reset clock signals). For example, the gate driver 221 may include a plurality of stages, each of which may be connected to the reset lines RSL1 to RSLn to output some clock signals CLKS as the reset signal in response to the start signal FLM or the output of the previous stage.

In an embodiment, the gate driver 221 may sequentially output the reset signals in units of sensor pixel rows. In one embodiment, the gate driver 221 may simultaneously output at least some reset signals to sensor pixels SPXL. In addition, the gate driver 221 may be connected to the sensor pixels SPXL through the scan lines SCL1 to SCLn and may include a shift register or an address decoder. In various embodiments, the gate driver 221 may apply the scan signal to drive a selected part of the sensor pixels SPXL. The gate driver 221 may apply the scan signal in units of sensor pixel rows.

In an embodiment, the gate driver 221 may supply the scan signals to at least some scan lines SCL1 to SCLn based on a start signal FLM and clock signals CLKS from the controller 223 (e.g., a scan start signal and scan clock signals). For example, the gate driver 221 may include a plurality of stages each connected to the scan lines SCL1 to SCLn, and each of the stages may output some clock signals CLKS as the scan signal in response to the start signal FLM or the output of the previous stage.

Each of the sensor pixels SPXL selected and driven by the gate driver 221 may sense light using a photoelectric element provided therein, and may output an electric signal (e.g., an analog signal) corresponding to the sensed light (sensing signal SS, see FIGS. 1A and 1B). For example, when the sensor pixel SPXL is connected to an i-th reset line RSLi (where i is a positive integer less than or equal to n) and an i-th scan line SCLi, the sensor pixel SPXL is initialized in response to a reset signal provided through the i-th reset line RSLi (e.g., charge generated by the photoelectric element is initialized), and an electric signal may be output in response to a scan signal provided through the i-th scan line SCLi. Example embodiments corresponding to the configuration and operation of the sensor pixel SPXL are described with reference to FIGS. 4 to 5.

The sensing driver 222 may be connected to the sensor pixels SPXL through readout lines RL1 to RLm (where m is a positive integer). As illustrated in FIG. 3, when the sensor pixel SPXL is connected to a j-th readout line RLj (where j is a positive integer less than or equal to m), the sensing driver 222 may receive an electric signal output from the sensor pixel SPXL through the j-th readout line RLj.

The sensing driver 222 may process signals output from the sensor pixels SPXL. For example, the sensing driver 222 may perform correlated double sampling (CDS) processing to remove noise from the received electric signal. In addition, the sensing driver 222 may convert analog signal received from the sensor pixels SPXL to digital signals. In an embodiment, an analog-to-digital converter may be provided for each sensor pixel column and may process analog signals received from the sensor pixel columns, for example, in parallel.

The controller 223 may control the gate driver 221 and the sensing driver 222. In an embodiment, the controller 223 may generate the start signal FLM and the clock signals CLKS. For example, the controller 223 may generate the start signal FLM (e.g., the reset start signal) and the clock signals CLKS (e.g., the reset clock signals) used to generate the reset signal. For example, the controller 223 may generate the start signal FLM (e.g., the scan start signal) and the clock signals CLKS (e.g., scan clock signals) used to generate the scan signal.

In one or more embodiments, the controller 223 may change the exposure time of one or more of the sensor pixels SPXL based on the fingerprint detection pattern information I_DP. The fingerprint detection pattern information I_DP may be provided from the panel driver 210 or another circuit.

In an embodiment, the controller 223 may control the gate driver 221 to change the pulse width of the scan signal (or a period in which the scan signal has a turn-on voltage level for turning on a transistor) based on the fingerprint detection pattern information I_DP. For example, the controller 223 may change the pulse width (or an on-duty period that corresponds to a ratio of a period having a turn-on voltage level for turning on a transistor) of the clock signals CLKS (or the start signal FLM) that is a basis of the scan signal. For example, the controller 223 may decrease the pulse width of the clock signals CLKS as the area in which the fingerprint detection pattern is displayed on the display panel 100 (see FIGS. 1A and 1B) decreases, according to the fingerprint detection pattern information I_DP. An embodiment of an operation of the controller 223 for changing the pulse width of the clock signals CLKS is described with reference to FIG. 11A.

In an embodiment, the controller 223 may generate image data corresponding to the sensing signal received from the sensing driver 222 and may process the generated image data. In addition, in an embodiment, the controller 223 may detect the fingerprint from the processed image data or may authenticate the detected fingerprint and/or transmit the detected fingerprint to an outside destination. However, this is only an example, and the image data generation and the fingerprint detection may not be performed by the controller 223, but may be performed by an external host processor or another device.

As described above, the fingerprint detection device FDD (or the fingerprint detector 220) may change the exposure time of one or more of the sensor pixels SPXL by changing the pulse width of the clock signals CLKS, which correlate to the scan signal, based on the fingerprint detection pattern information I_DP.

Figure 4:
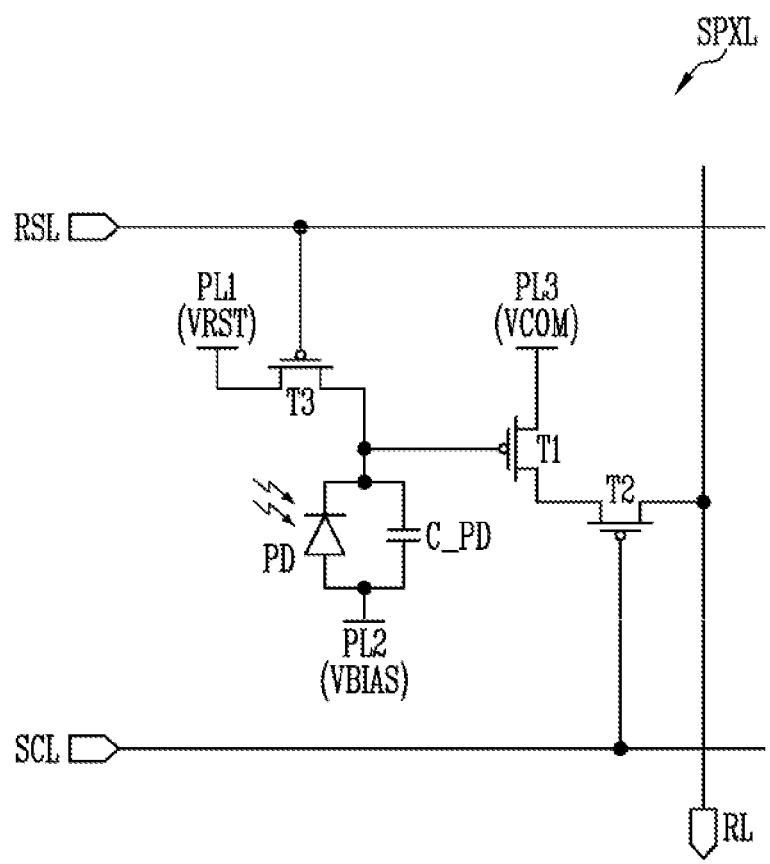
FIG. 4 illustrating an embodiment of a sensor pixel.
Figure 5:
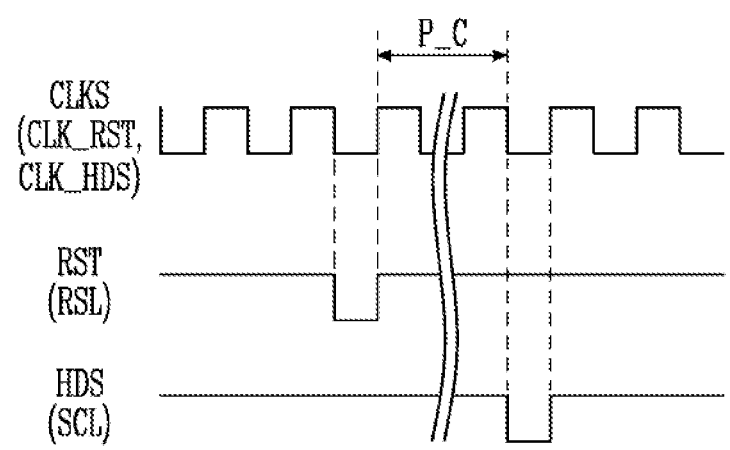
FIG. 5 illustrates an embodiment of operation of the sensor pixel.

FIG. 4 is a circuit diagram illustrating an embodiment of a sensor pixel SPXL, which, for example, may be representative of the sensor pixels in the input sensing device of FIG. 3. The reset line RSL may be one of the reset lines RSL1 to RSLn, the scan line SCL may be one of the scan lines SCL1 to SCLn, and the readout line RL may be one of the readout lines RL1 to RLm. FIG. 5 is a waveform diagram illustrating an embodiment of operation of the sensor pixel of FIG. 4.

Referring to FIGS. 3 and 4, the sensor pixel SPXL may include a first transistor T1, a second transistor T2, a third transistor T3, a photodiode PD, and a capacitor C_PD. The photodiode PD may include an anode electrode connected to a second power line PL2 and a cathode electrode connected to a gate electrode of a first transistor T1. A bias voltage VBIAS for driving the photodiode PD may be applied to the second power line PL2.

The capacitor C_PD may be connected between the gate electrode of the first transistor T1 and the second power line PL2, and also may be connected in parallel to the photodiode PD. The capacitor C_PD may store charges photoelectrically converted by the photodiode PD. In one embodiment, the capacitor C_PD may be omitted.

The third transistor T3 may include a first electrode connected to the first power line PL1, a second electrode connected to the gate electrode of the first transistor T1, and a gate electrode connected to the reset line RSL. A reset voltage VRST may be applied to the first power line PL1. The third transistor T3 may electrically connect the first power line PL1 to the gate electrode of the first transistor T1 in response to the reset signal RST applied to the reset line RSL. In this case, a voltage applied to the gate electrode of the first transistor T1 (or a voltage stored in the capacitor C_PD) may be initialized or reset by the reset voltage VRST.

As illustrated in the embodiment of FIG. 5, according to operation of the gate driver 221, the reset signal RST may correspond to one of the pulses of the clock signals CLKS (e.g., reset clock signal CLK_RST).

The first transistor T1 may have a first electrode connected to the third power line PL3, its second electrode connected to the first electrode of the second transistor T2, and its gate electrode connected to the cathode electrode of the photodiode PD. A common voltage VCOM may be applied to the third power line PL3. The first transistor T1 may control the amount of current flowing from the third power line PL3 to the second transistor T2 in response to the voltage stored in the capacitor C_PD (e.g., the charges photoelectrically converted from the photodiode PD). The first transistor T1 may operate as an amplifier that amplifies and outputs the voltage stored in the capacitor C_PD.

The second transistor T2 may have its first electrode connected to the second electrode of the first transistor T1, its second electrode connected to the readout line RL, and its gate electrode connected to the scan line SCL. The second transistor T2 may form a current movement path between the first transistor T1 (or the third power line PL3) and the readout line RL in response to the scan signal HDS applied to the scan line SCL. As illustrated in FIG. 5, according to operation of the gate driver 221, the scan signal HDS may correspond to one of the pulses of the clock signals CLKS (e.g., scan clock signal CLK_HDS), and the scan signal HDS having the turn-on voltage level may be applied to the scan line SCL after a specific time P_C has elapsed from the time when the application of the reset signal RST of the turn-on voltage level is completed.

For example, the second transistor T2 may be turned on in response to the scan signal HDS of the turn-on voltage level, and the second electrode of the first transistor T1 may be electrically connected to the readout line RL. In this case, the electric signal corresponding to the voltage that is based on the charges photoelectrically converted by the photodiode PD (or the voltage stored in the capacitor C_PD for the specific time P_C) may be output to an outside destination (e.g., sensing driver 222, see FIG. 3) through the readout line RL.

In FIG. 4, an example is illustrated in which the transistors T1, T2, and T3 are P-type transistors, but one or more of these transistors may be of N-type transistors in another embodiment. Also, the circuit structure of the sensor pixel SPXL may be different in another embodiment.

Figure 6:
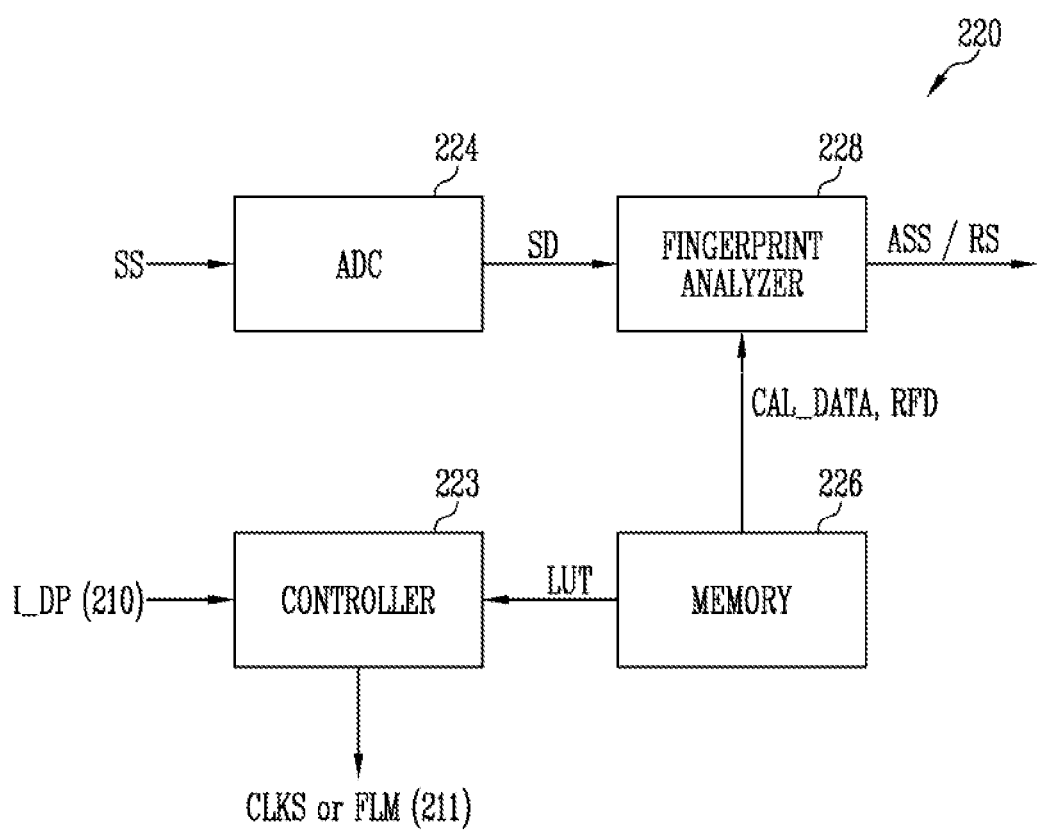
FIG. 6 illustrates an embodiment of a fingerprint detector.

FIG. 6 is a block diagram illustrating an embodiment of fingerprint detector 220 in the fingerprint detection device of FIG. 3. The fingerprint detector 220 may perform fingerprint authentication in response to a fingerprint detection command, for example, from an internal or external source.

Referring to FIGS. 3 and 6, the fingerprint detector 220 may include the controller 223, an analog-to-digital converter 224, a memory 226, and a fingerprint analyzer 228. The analog-to-digital converter 224 may convert an analog sensing signal SS to a digital sensing data SD.

The memory 226 may store calibration data CAL_DATA and registered fingerprint data RFD. The calibration data CAL_DATA may include data for calibrating a deviation in the amount of light received according to the positions of one or more of the sensor pixels SPXL (e.g., see FIG. 3), and in one embodiment may include calibration values corresponding to at least some sensor pixels SPXL. For example, the calibration data CAL_DATA may be generated during a process of manufacturing of the fingerprint detection device FDD (or the display device 1000) and may be stored in the memory 226. The registered fingerprint data RFD may be generated based on the sensing data SD from the analog-to-digital converter 224 in a separate fingerprint registration period and may be stored in the memory 226.

In one embodiment, the memory 226 may store a lookup table (LUT), which may include information relating to exposure times of the sensor pixels SPXL corresponding to the fingerprint detection pattern information I_DP. For example, the lookup table LUT may include a relationship between the times when the sensor pixel SPXL detects reflected light (or a time when an electric signal corresponding to the detected reflected light is output), based on the area information corresponding to the area in which the fingerprint detection pattern is displayed (or the area in which the touch area occurs). As will be described later, the lookup table LUT may include a plurality of items of exposure time information corresponding to a plurality of items of area information, or information corresponding to an equation (or model) obtained by modeling a relationship between area information and exposure time.

The fingerprint analyzer 228 may receive sensing data SD from the analog-to-digital converter 224 and may receive the calibration data CAL_DATA from the memory 226. The fingerprint analyzer 228 may calibrate the sensing data SD using the calibration data CAL_DATA. For example, the fingerprint analyzer 228 may calibrate the deviation of data values in the sensing data SD (e.g., deviation due to deviation in the received light amount of the sensor pixels SPXL) based on the calibration data CAL_DATA. In one embodiment, the fingerprint analyzer 228 may calibrate the sensing data SD by a method of summing the calibration value corresponding to a sensor pixel SPXL (among the calibration values in the calibration data CAL_DATA) and the data value corresponding to the specific sensor pixel SPXL (among the data values in the sensing data SD).

In one embodiment, the registered fingerprint data RFD may also be generated by calibrating sensing data SD obtained in the fingerprint registration period by the fingerprint analyzer 228 by using the calibration data CAL_DATA.

The fingerprint analyzer 228 may receive the registered fingerprint data RFD from the memory 226 and may perform fingerprint authentication by comparing the calibrated sensing data (e.g., data generated by calibrating the sensing data SD by calibration data CAL_DATA) with the registered fingerprint data RFD.

The fingerprint analyzer 228 may calculate a matching rate between the calibrated sensing data and the registered fingerprint data RFD. In an embodiment, the fingerprint analyzer 228 may generate a fingerprint image corresponding to the calibrated sensing data and may perform fingerprint authentication by comparing the generated fingerprint image with the fingerprint image of the registered fingerprint data RFD. For example, the fingerprint analyzer 228 may extract feature points from the fingerprint image and may perform fingerprint authentication by comparing the extracted feature points with feature points in the registered fingerprint data RFD. However, this is only an example, and the method of performing fingerprint authentication may be implemented by various other fingerprint recognition methods. To this end, the fingerprint analyzer 228 may include a hardware configuration and/or a software configuration.

When the matching rate is greater than or equal to a preset threshold, the fingerprint analyzer 228 may determine that the detected fingerprint matches the registered fingerprint data RFD. When the matching rate is less than the threshold, the fingerprint analyzer 228 may determine that the detected fingerprint does not match the registered fingerprint data RFD.

When the fingerprint analyzer 228 determines that the detected fingerprint matches the registered fingerprint data RFD, the fingerprint analyzer 228 may output an approval signal ASS. When the fingerprint analyzer 228 determines that the detected fingerprint does not match the registered fingerprint data RFD, the fingerprint analyzer 228 may output a rejection signal RS. The approval signal ASS or the rejection signal RS may be output, for example, to an external designation (e.g., a host processor). Execution of the display device 1000 or a corresponding application may be based on whether the approval signal ASS or the rejection signal RS is output.

The controller 223 may generate the start signal FLM and the clock signals CLKS. In embodiments, the controller 223 may change the exposure time of one or more sensor pixels SPXL based on the fingerprint detection pattern information I_DP and the lookup table LUT. For example, the controller 223 may change the pulse width of the clock signals CLKS (or on-duty of the clock signals CLKS) or the pulse width of the start signal FLM based on the fingerprint detection pattern information I_DP and the look-up table LUT.

Figure 7:
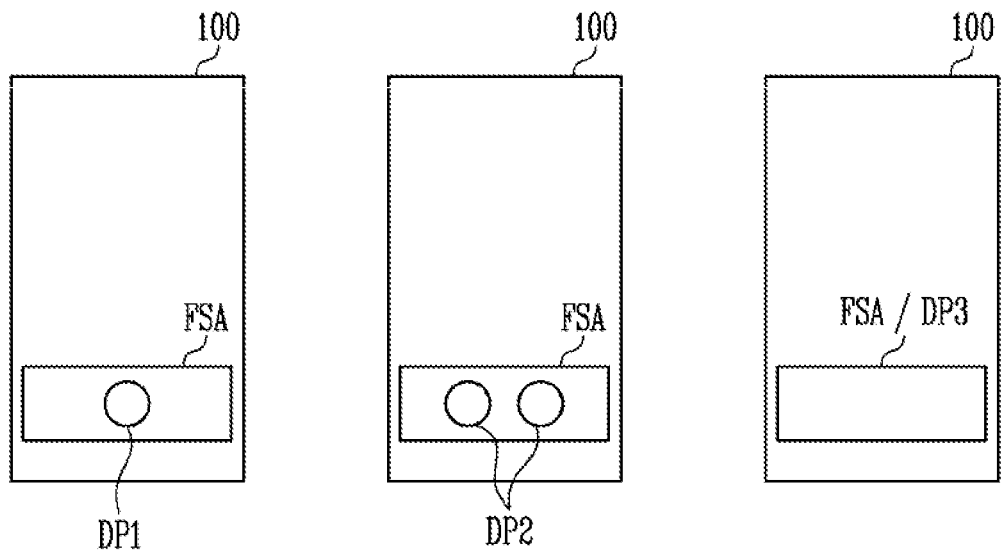
FIG. 7 illustrates examples of fingerprint detection patterns.
Figure 8:
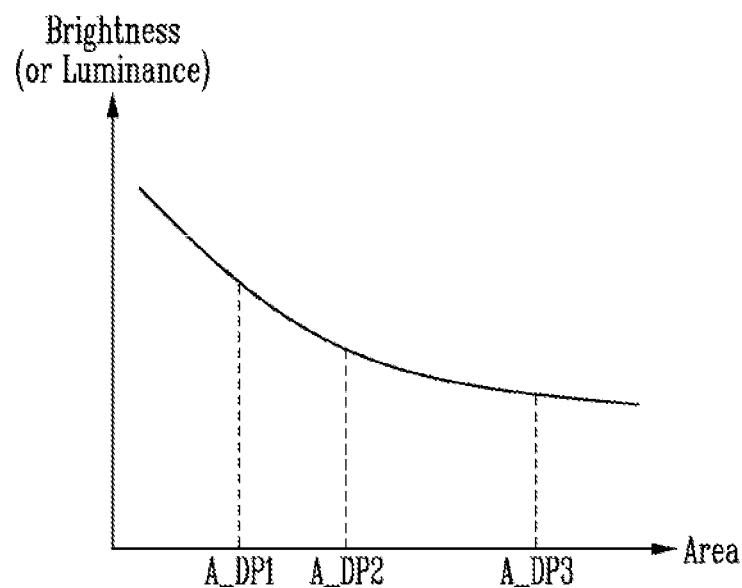
FIG. 8 illustrates an example of luminance (or brightness) according to area of the fingerprint detection patterns of FIG. 7.
Figure 9:
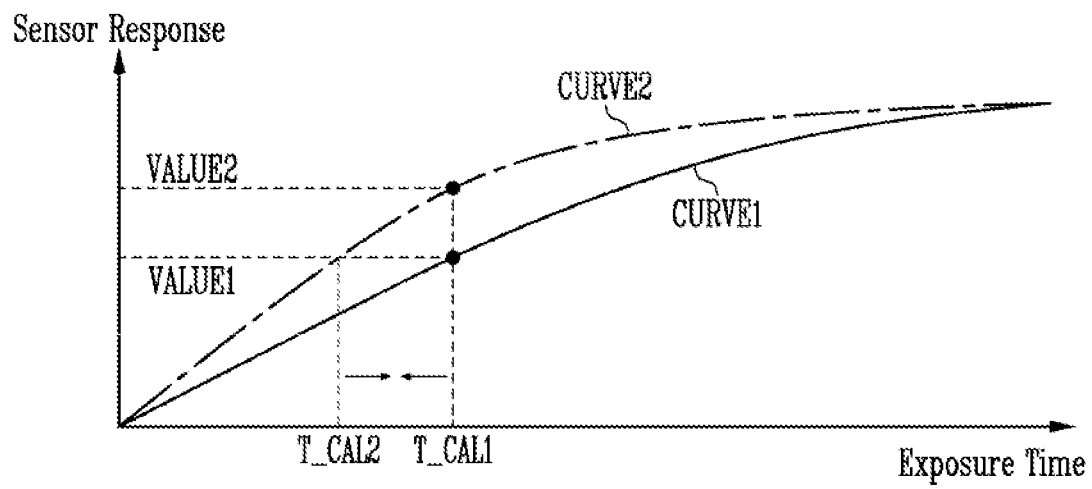
FIG. 9 illustrates an example of sensing sensitivity according to exposure time of a sensor pixel.
Figure 10:
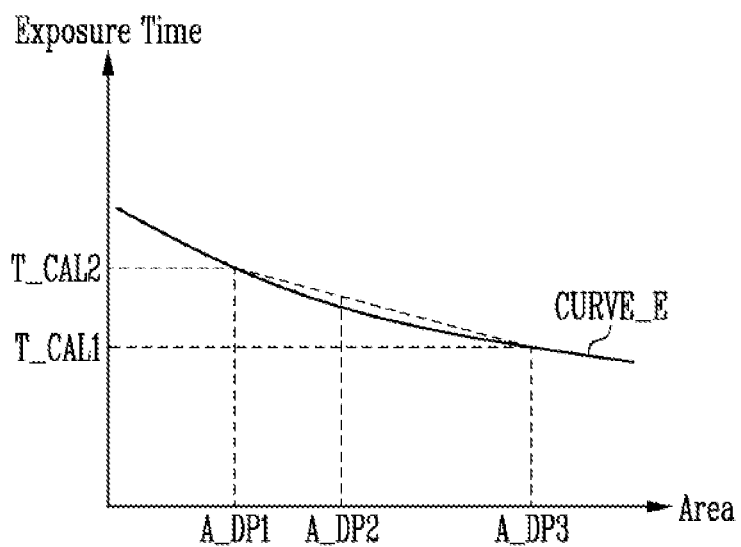
FIG. 10 illustrates an example of exposure time of a sensor pixel according to area of the fingerprint detection patterns of FIG. 7.
Figure 11A:
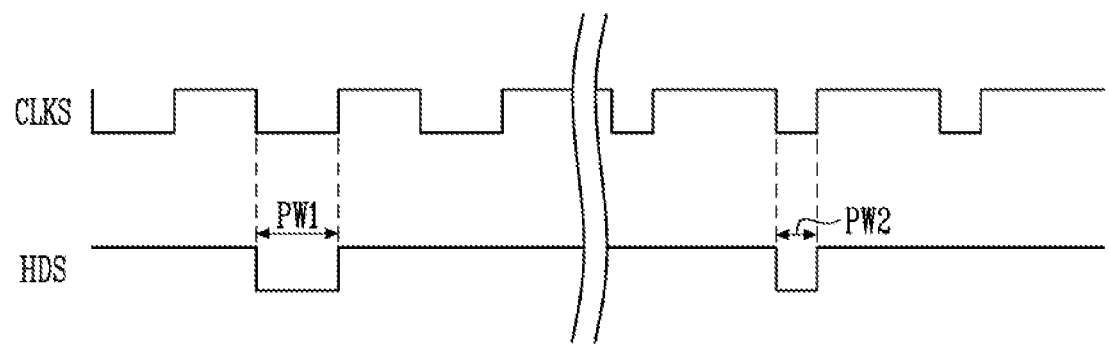
FIGS. 11A and 11B illustrate examples of adjusting exposure time of a sensor pixel.
Figure 11B:
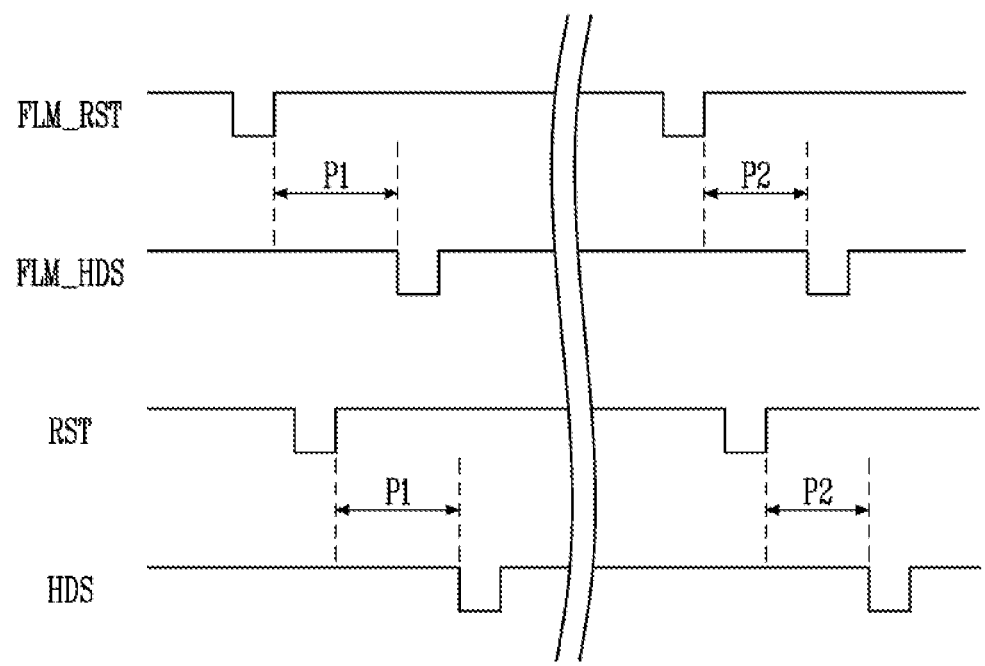

FIGS. 7 to 10, 11A, and 11B are provided to illustrate sensing sensitivities that may exist in various circumstances and to explain example embodiments which may be used to change exposure time by controller 223. FIG. 7 illustrates one example of fingerprint detection patterns which may be displayed on fingerprint sensing area FSA of the display panel in the display device 1000 of FIG. 1A and FIG. 1B. FIG. 8 illustrates an example of a curve for luminance corresponding to the area of the fingerprint detection patterns of FIG. 7. FIG. 9 is a diagram illustrating an example of sensing sensitivity based on exposure time of a sensor pixel, which may be one or more of sensor pixels used to detect a fingerprint. FIG. 10 is a diagram illustrating an embodiment of exposure time of the sensor pixel based on the area of the fingerprint detection patterns of FIG. 7. FIGS. 11A and 11B are diagrams illustrating example embodiments of adjusting the exposure time of the sensor pixel.

Referring to FIGS. 1A, 1B, 6, and 7, the display panel 100 may display a fingerprint detection pattern (or display pattern) for fingerprint detection in at least a partial area of the fingerprint sensing area FSA. The fingerprint detection pattern may be an image or an image pattern having a luminance corresponding to a specific grayscale value. For example, the fingerprint detection pattern may be a white image pattern having a maximum luminance corresponding to a maximum grayscale value. In one case, the display panel 100 may display a white image pattern corresponding to a maximum grayscale value in an area in which a user touch occurs. In one case, the fingerprint detection pattern may include a pattern having a specific color (e.g., a pattern having black or gray color) that simulates a fingerprint on a white background.

For example, when one finger of a user touches the fingerprint sensing area FSA, the display panel 100 may display a first fingerprint detection pattern DP1 having a maximum (or other predetermined) luminance corresponding to a maximum (or other predetermined) grayscale value in an area touched by one finger. The display panel 100 may not display an image in remaining portions of the fingerprint sensing area FSA, except for the area where contact was made by the finger. In one case, the display panel 100 may display an image pattern (e.g., black image) corresponding to a minimum luminance in the remaining areas. In one embodiment, the touch location and/or remaining portions of the FSA may include different distinguishable images or patterns.

In one case, when two fingers of a user touch the fingerprint sensing area FSA, the display panel 100 may display a second fingerprint detection pattern DP2 having a maximum (or other predetermined) luminance corresponding to a maximum (or other predetermined) grayscale value in an area touched by two fingers. In another example, when a palm of a user touches the fingerprint sensing area FSA, the display panel 100 may display a third fingerprint detection pattern DP3 having a maximum (or other predetermined) luminance corresponding to a maximum (or other predetermined) gray scale value in a greater portion of or the entire fingerprint sensing area FSA.

Referring to FIGS. 7 and 8, the luminance of the fingerprint detection pattern may change according to the area of the fingerprint detection pattern. As illustrated in FIG. 8, as the area of the fingerprint detection pattern increases, luminance of the fingerprint detection pattern may decrease. For example, as the area of the fingerprint detection pattern increases, the number of sensor pixels SPXL that emit light with a maximum (or other predetermined) luminance corresponding to the maximum (or other predetermined) grayscale value increases. The total amount of current supplied to or flowing to the sensor pixels SPXL (or the display panel 100) increases, and the voltage drop for the driving voltage (or the power supply voltage) applied to the sensor pixels SPXL increases due to the increased total amount of current and the resistance component on the current movement path. Therefore, the luminance of the fingerprint detection pattern (e.g., luminance displayed or measured on display panel 100 corresponding to a specific target luminance to be displayed) may be relatively lowered. In other words, although the target luminance is constant, as the area of the fingerprint detection pattern decreases, the luminance (e.g., the actually measured luminance) of the fingerprint detection pattern may increase.

For example, when the second area A_DP2 of the second fingerprint detection pattern DP2 is larger than the first area A_DP1 of the first fingerprint detection pattern DP1, the luminance of the second fingerprint detection pattern DP2 may be lower than the luminance of the first fingerprint detection pattern DP1. Similarly, when the third area A_DP3 of the third fingerprint detection pattern DP3 is larger than the second area A_DP2 of the second fingerprint detection pattern DP2, the luminance of the third fingerprint detection pattern DP3 may be lower than the luminance of the second fingerprint detection pattern DP2. As the luminance of the fingerprint detection pattern increases, the amount of light reflected (or amount of light received) and detected by the sensor pixels SPXL increases, or reactivity of the sensor pixel SPXL to reflected light (e.g., sensing sensitivity) may be increased. Thus, the amount of light received (or the sensing sensitivity) of the sensor pixels SPXL may change due to a change in the area of the fingerprint detection pattern.

As a result, a difference may occur between a luminance condition (e.g., a calibration condition) of the display panel 100 in a process of generating the calibration data CAL_DATA for calibrating the deviation of the amount of light received based on positions of the sensor pixels SPXL and a luminance condition (e.g., a user condition) of the display panel 100 during fingerprint detection. For example, in the process of generating the calibration data CAL_DATA, the third fingerprint detection pattern DP3 may be used to compensate all (or a predetermined number of) sensor pixels SPXL in the fingerprint sensing area FSA, and in the process of detecting the fingerprint of the user the first fingerprint detection pattern DP1 may be used in correspondence with the finger of the user.

The area (and luminance accordingly) of the third fingerprint detection pattern DP3 and the area of the first fingerprint detection pattern DP1 may be different from each other. Therefore, in the sensor pixel SPXL operating with the substantially the same driving condition (e.g., substantially the same exposure time), sensing sensitivity and luminance deviation of the third fingerprint detection pattern DP3 may different from the sensing sensitivity and luminance deviation of the first fingerprint detection pattern DP1. When using a method of applying the calibration data CAL_DATA generated based on the third fingerprint detection pattern DP3 as is, the sensing data generated based on the first fingerprint detection pattern DP1 (e.g., sensing data to which the sensing sensitivity of a pixel SPXL under different luminance conditions and the deviation thereof are reflected) may not be accurately calibrated.

Referring to FIG. 9, a first curve CURVE1 may represent the sensing sensitivity (or amount of light received) of a sensor pixel SPXL in a process of generating the calibration data CAL_DATA. For example, the calibration data CAL_DATA (e.g., see FIG. 6) may be generated using the third fingerprint detection pattern DP3 illustrated in FIG. 7, to calibrate the deviation of all or a predetermined number of sensor pixels SPXL in the fingerprint sensing area FSA. The first curve CURVE1 may represent the sensing sensitivity of the sensor pixel SPXL with respect to the third fingerprint detection pattern DP3.

The second curve CURVE2 may represent the sensing sensitivity (or amount of light received) of the sensor pixel SPXL in the process of detecting the fingerprint of the user. During actual fingerprint detection, fingerprint detection patterns of various sizes may be used. For example, the first fingerprint detection pattern DP1 may be used, and the second curve CURVE2 may represent the sensing sensitivity of the sensor pixel SPXL with respect to the first fingerprint detection pattern DP1.

During the process of generating the calibration data CAL_DATA, the sensor pixel SPXL may have a first sensing value VALUE1 (or a first sensing sensitivity) corresponding to a first exposure time T_CAL1 according to the first curve CURVE1. The first exposure time T_CAL1 may be a preset value set or used in a manufacturing process of the fingerprint detection device FDD. For example, the first exposure time T_CAL1 may be an exposure time of the sensor pixel SPXL which corresponds to the third fingerprint detection pattern DP3, and in which the difference in the amounts of light received due to valleys and ridges of a fingerprint is maximized.

In the process of detecting the fingerprint, the sensor pixel SPXL may have a second sensing value VALUE2 (or second sensing sensitivity) corresponding to the first exposure time T_CAL1 according to the second curve CURVE2. The second sensing value VALUE2 may be greater than or equal to the first sensing value VALUE1. Therefore, the calibration data CAL_DATA (e.g., calibration value set based on the first value VALUE1) may not be effective in calibrating the sensing data generated when the fingerprint is actually detected (e.g., sensing data generated based on the second value VALUE2).

Therefore, in one embodiment the controller 223 may change the exposure time of one or more sensor pixels SPXL, so that the one or more sensor pixels SPXL have the first sensing value VALUE1 (or the sensing sensitivity of the sensor pixel SPXL when the calibration data CAL_DATA is generated) in the process of detecting the fingerprint. For example, according to the second curve CURVE2, the controller 223 may adjust the exposure time of a sensor pixel SPXL from the first exposure time T_CAL1 to the second exposure time T_CAL2. In this case, the calibration data CAL_DATA set based on the sensor pixel SPXL having the first sensing value VALUE1 (or the first sensing sensitivity) may be effectively applied to the sensing data SD (e.g., sensing data SD generated using the sensor pixel SPXL adjusted to have the first sensing sensitivity when the fingerprint is detected). Therefore, the sensing data SD may be more accurately calibrated, and the fingerprint of the user may be more accurately detected.

Referring to FIG. 10, an exposure time curve CURVE_E represents an example of an exposure time of a sensor pixel SPXL according to areas of fingerprint detection patterns.

In an embodiment, the first exposure time T_CAL1 may be preset corresponding to the third area A_DP3 of the third fingerprint detection pattern DP3, and the second exposure time T_CAL2 may be preset corresponding to the first area A_DP1 of the first fingerprint detection pattern DP1. For example, the first exposure time T_CAL1 and the second exposure time T_CAL2 may be measured in a process of manufacturing the fingerprint detection device FDD and may be stored in the lookup table LUT. Thus, exposure times for at least two fingerprint detection patterns having different areas may be previously stored in the lookup table LUT.

In one embodiment, the controller 223 may determine the exposure time of the sensor pixel SPXL by interpolating (or extrapolating) the first exposure time T_CAL1 and the second exposure time T_CAL2 based on the area of the fingerprint detection pattern obtained when the fingerprint is detected. For example, in the fingerprint detection process, when the second fingerprint detection pattern DP2 is used, the controller 223 may determine the exposure time of the sensor pixel SPXL by interpolating the first exposure time T_CAL1 and the second exposure time T_CAL2 based on the second area A_DP2 of the second fingerprint detection pattern DP2.

In one embodiment, the controller 223 may calculate or determine the exposure time corresponding to the area of the fingerprint detection pattern obtained when the fingerprint is detected using an equation preset for the exposure time. The equation may be modeled, for example, based on the first exposure time T_CAL1 and the second exposure time T_CAL2 measured in the manufacturing process of the fingerprint detection device FDD. In this case, one or more coefficients (or variables) of the equation may be set.

For example, the controller 223 may calculate the exposure time based on Equation 1:

$$LUMI_{FullActive} \times T_{CAL1} = LUMI_{FingerActive} \times \frac{T_{CAL2}}{\alpha} \quad (1)$$

$$T_{CAL2} = \alpha \times T_{CAL1} \times \frac{LUMI_{FullActive}}{LUMI_{FingerActive}}$$

where LUMIFullActive is the luminance of the fingerprint detection pattern corresponding to the entire fingerprint sensing area FSA, TCAL1 is the exposure time of the sensor pixel set corresponding to LUMIFullActive, LUMIFingerActive is the luminance of the fingerprint detection pattern displayed for fingerprint detection, TCAL2 is the exposure time of the sensor pixel corresponding to LUMIFingerActive, and a is the coefficient or variable. LUMIFullActive, TCAL1, and a may be preset and stored in the lookup table LUT. LUMIFingerActive may be derived, for example, from the fingerprint detection pattern information I_DP (e.g., the area of the fingerprint detection pattern) and the exposure time curve CURVE_E, and the exposure time curve CURVE_E may be preset and stored in the lookup table LUT.

In one example, the controller 223 may calculate the exposure time based on Equation 2:

$$T_{CAL2} = \alpha \times T_{CAL1} \times \frac{LUMI_{FullActive}}{LUMI_{FingerActive}} \quad (2)$$

where TCAL2 is the exposure time of the sensor pixel corresponding to AREAFingerActive, β is the coefficient or variable, TCAL1 is the exposure time of the sensor pixel set corresponding to AREAFullActive, AREAFingerActive is the area of the fingerprint detection pattern displayed for fingerprint detection, and AREAFullActive is the area of the fingerprint detection pattern corresponding to the entire fingerprint sensing area FSA. Here, AREAFullActive, TCAL1, and β may be preset and stored in the lookup table LUT.

As described above, the controller 223 may determine or calculate the exposure time of the sensor pixel SPXL using preset exposure times for at least two fingerprint detection patterns having different areas or using a previously modeled equation. In one or more embodiments, the controller 223 may change the pulse width of the clock signals CLKS (or the start signal FLM) in response to the exposure time of the sensor pixel SPXL or may change the application time of the start signals FLM.

Referring to FIG. 11A, for example, when the third fingerprint detection pattern DP3 is used for fingerprint detection, the controller 223 may generate clock signals CLKS having a first pulse width PW1 (e.g., a scan clock signal). In this case, as described with reference to FIG. 5, the scan signal HDS having the first pulse width PW1 may be generated, and the sensor pixel SPXL (e.g., see FIG. 4) may output an electric signal for a time (e.g., first exposure time T_CAL1) corresponding to the first pulse width PW1.

In one example, when the first fingerprint detection pattern DP1 (or the second fingerprint detection pattern DP2) is used for fingerprint detection, the controller 223 may generate clock signals CLKS (e.g., a scan clock signal) having a second pulse width PWM2. In this case, scan signal HDS having the second pulse width PW2 may be generated, and the sensor pixel SPXL may output an electric signal for a time (e.g., the second exposure time T_CAL2) corresponding to the second pulse width PW2.

In FIG. 11A, the controller 223 controls the pulse width of the clock signal CLKS based on the assumption that the exposure time is similar to the period of the clock signal CLKS. For example, when the exposure time is more than twice than the clock signal CLKS, the controller 223 may adjust the pulse width of the start signal FLM having the turn-on voltage level, e.g., to adjust the pulse width of the scan signal HDS, the controller 223 may adjust the pulse width of the start signal FLM corresponding to the scan signal HDS.

In FIG. 11B, when the third fingerprint detection pattern DP3 is used for fingerprint detection, the controller 223 may generate the scan start signal FLM_HDS of the turn-on voltage level after the first time P1 from the time when the reset start signal FLM_RST of the turn-on voltage level is output. Since the reset signal RST described with reference to FIG. 4 is generated in response to the reset start signal FLM_RST and since the scan signal HDS is generated in response to the scan start signal FLM_HDS, the scan signal HDS of the turn-on voltage level may be output after the first time P1 from the time when the reset signal RST of the turn-on voltage level is output. In this case, for the first time P1 (e.g., the first exposure time T_CAL1), charges photoelectrically converted by the photodiode PD (e.g., see FIG. 4) may be stored in the capacitor C_PD, and the sensor pixel SPXL may output an electric signal in response to the voltage stored in the capacitor C_PD.

In one embodiment, when the first fingerprint detection pattern DP1 (or the second fingerprint detection pattern DP2) is used for fingerprint detection, the controller 223 may generate the scan start signal FLM_HDS of the turn-on voltage level after the second time P2 from the time when the reset start signal FLM_RST of the turn-on voltage level is output. In this case, for the second time P2 (e.g., the second exposure time T_CAL2), charges photoelectrically converted by the photodiode PD may be stored in the capacitor C_PD, and the sensor pixel SPXL may output an electric signal in response to the voltage stored in the capacitor C_PD, e.g., the controller 223 may adjust the time at which the scan signal HDS is applied to the sensor pixel SPXL after the capacitor C_PD of the sensor pixel SPXL is initialized (or reset).

Thus, the controller 223 may change the exposure time of the sensor pixel SPXL based on the area (or size) of the fingerprint detection pattern in the fingerprint detection pattern information I_DP. As a result, the calibration data CAL_DATA set based on the sensor pixel SPXL having a specific sensing sensitivity may be effectively applied to the sensing data SD (e.g., sensing data SD generated using the sensor pixel SPXL may be adjusted to have substantially the same specific sensing sensitivity as when the calibration data CAL_DATA is generated). The sensing data SD may therefore be more accurately calibrated, and a fingerprint may be more accurately detected.

FIG. 12 is a flowchart illustrating a calibration method of an input sensing device according to one or more embodiments. The method of FIG. 12 may be performed, for example, on display device 1000 (or the input sensing device) of FIGS. 1A and 1B.

Referring to FIGS. 1A, 1B, 3, 4, 6, and 12, the method may include, at S100, performing an electric test on the display device 1000 (or the input sensing device). For example, the method of FIG. 12 may include applying driving voltages (or power voltages) to the display device 1000 and testing whether the display device 1000 (e.g., the display panel 100 and the fingerprint detection device FDD) operates normally or as expected. For example, the method of FIG. 12 may include testing whether the display panel 100 normally displays the fingerprint detection pattern in the fingerprint detection area FSA. In one embodiment, the method of FIG. 12 may include testing whether one or more sensor pixels SPXL of FIG. 4 operates normally, e.g., whether the photodiode PD operates normally and/or whether the transistors T1 to T3 operate normally. For illustrative purposes, only one sensor pixel SPXL will be discussed, with the understanding that similar operations may be performed for one or more other sensor pixels SPXL.

The method may also include setting the exposure time of the sensor pixel SPXL using fingerprint detection patterns (or display patterns) having different sizes in a plan view. For example, the exposure time of the sensor pixel SPXL may be set using test patterns having different sizes in a plan view (or test objects having different areas in contact with the fingerprint detection area FSA). As described above, the exposure time may correspond to a time when the sensor pixel SPXL receives the reflected light or to a time when electric signal(s) corresponding to the reflected light is output from the sensor pixel SPXL.

The magnitude of an electric signal received from the sensor pixel SPXL by the fingerprint detector 220 may change according to the exposure time. For example, the method may include setting or optimizing the exposure time of the sensor pixel SPXL, so that the difference in the amount of light received by valleys and ridges of a fingerprint is maximized (or increased) for a fingerprint detection pattern having a specific size.

At S200, for example, the method may include setting a first exposure time of the sensor pixel SPXL using a first fingerprint detection pattern (or first display pattern) corresponding to at least a portion of fingerprint sensing area FSA. The portion may be the entire fingerprint sensing area FSA or a lesser portion thereof.

At S300, the method may include setting a second exposure time of the sensor pixel SPXL using a second fingerprint detection pattern (or the second display pattern) which is smaller than the first fingerprint detection pattern. In one embodiment, information indicative of the first exposure time and the second exposure time may be stored, for example, in the lookup table LUT described with reference to FIG. 6.

In one embodiment, the method may include setting or modeling an equation for determining exposure time of the one or more sensor pixels SPXL (e.g., based on Equation 1 or Equation 2 described with reference to FIG. 10) using at least one of the first exposure time or the second exposure time. Example embodiments for setting the first exposure time and the second exposure time are described with reference to FIGS. 13 to 16.

At S400, the method may include calculating a deviation in the amount of light received according to positions of the one or more sensor pixels SPXL. For example, the method may include setting the calibration value for each corresponding sensor pixel SPXL so that the sensing sensitivity (or sensing value, see FIG. 9) of the sensor pixels SPXL becomes uniform.

For example, the method may include obtaining sensing data using the test object corresponding to the entire (or a predetermined portion of the) fingerprint sensing area FSA (e.g., the test object having a flat surface without valleys and ridges and having a specific color (e.g., white) and the first fingerprint detection pattern corresponding to the entire (or predetermined portion of) fingerprint sensing area FSA. In one embodiment, the method may include setting calibration values for calibrating deviations of data values in the sensing data. For example, the method may include setting an offset value for calibrating the sensing sensitivity (or sensing value) of each of the one or more sensor pixels SPXL as the calibration value. However, this is only an example, and the calibration value is not limited to the offset value for sensing sensitivity. The calibration value for each of one or more sensor pixels SPXL may be used to generate the calibration data CAL_DATA (e.g., see FIG. 6).

At S500, the method may include performing an optical test on the display device 1000. For example, the method may include testing whether the display device 1000 accurately detects the fingerprint using a preset fingerprint (or a simulated fingerprint of a user) and preset registered fingerprint data RFD (e.g., see FIG. 6) corresponding thereto. For example, the sensing data may be obtained by contacting the display device 1000 with the simulated fingerprint, and the sensing data may be calibrated using the calibration values (e.g., the calibration values obtained in operation S400). The calibrated sensing data may be compared with the registered fingerprint data (e.g., the registered fingerprint data corresponding to the simulated fingerprint).

When the optical test is not performed normally (e.g., when the display device 1000 does not accurately detect the fingerprint), operation S400 of performing calibration of the sensor pixel SPXL and operation S500 of performing the optical test may be repeatedly performed.

At S600, when the optical test is performed normally, the method may include generating the calibration data CAL_DATA (e.g., see FIG. 6). For example, the method may include generating the calibration data CAL_DATA based on the calibration values set in the operation of performing the calibration on the one or more sensor pixels SPXL. The calibration data CAL_DATA may be stored, for example, in the memory 226 (e.g., see FIG. 6).

In the method embodiments of FIG. 12, the calibration data CAL_DATA is generated (S600) after the optical test is performed (S500). In one embodiment, after operation S400 of performing calibration on the sensor pixel(s) SPXL, the method may include generating or updating calibration data CAL_DATA before the optical test is performed.

Also, as described above, the method of FIG. 12 may include setting the exposure time of a sensor pixel SPXL using fingerprint detection patterns having different sizes in a plan view. In addition, an equation may be set or modeled using the set exposure times, e.g., Equation 1 or Equation 2 described with reference to FIG. 10.

The display device 1000 may use the set exposure time or equation to adjust the sensing sensitivity of the sensor pixel SPXL when detecting the fingerprint in substantially the same manner as sensing sensitivity of the sensor pixel SPXL when generating the calibration data CAL_DATA. As a result, the sensing data SD may be more accurately calibrated using the calibration data CAL_DATA, and thus a fingerprint may be more accurately detected.

Figure 13:
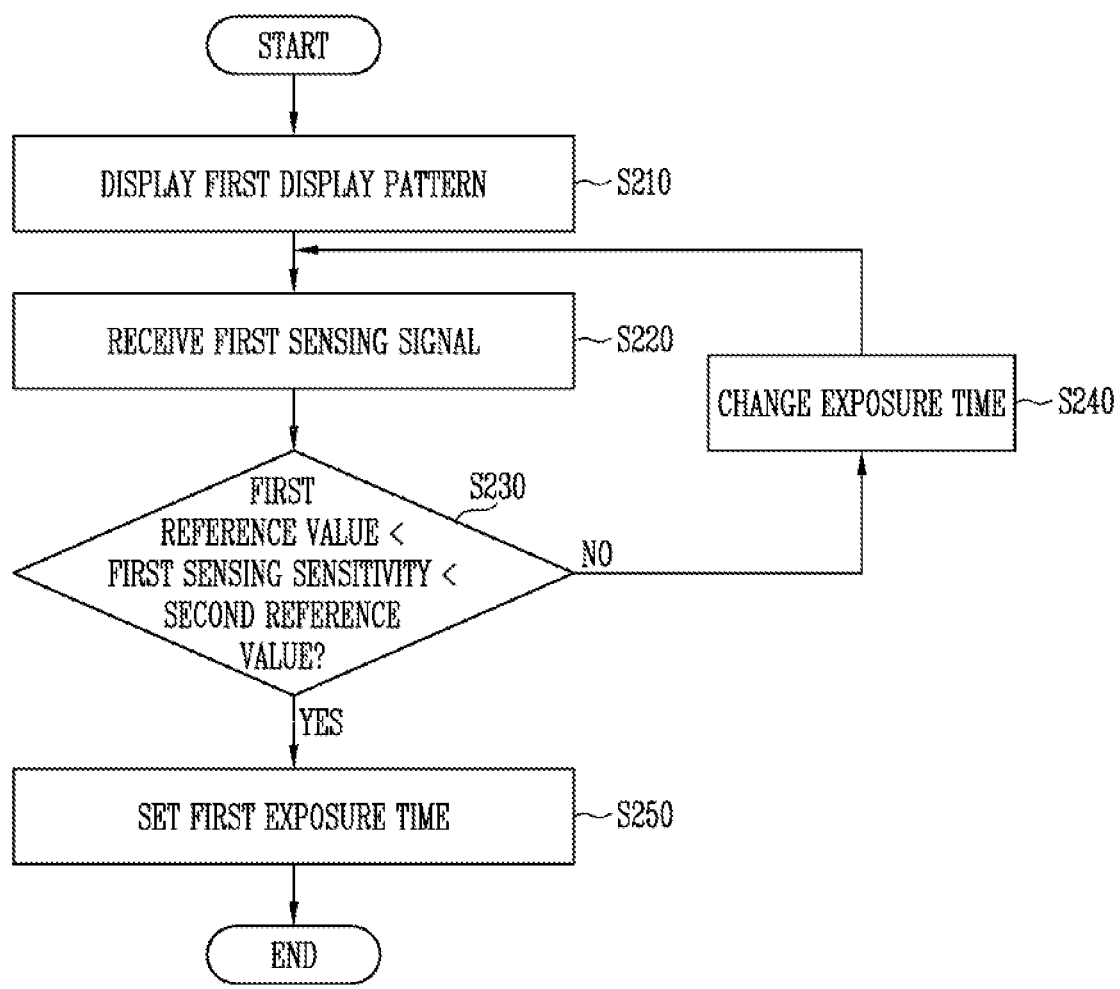
FIG. 13 illustrates an embodiment of a process of setting a first exposure time.
Figure 14:
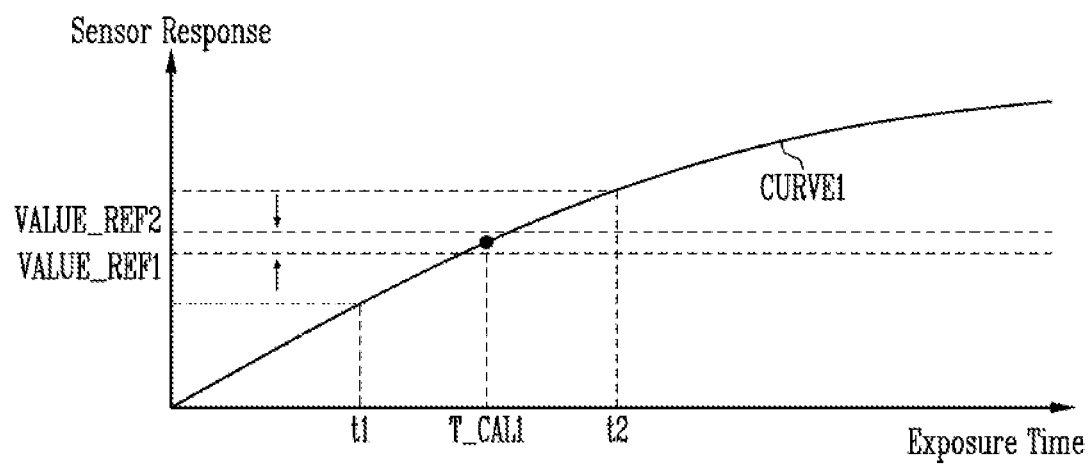
FIG. 14 illustrates an embodiment of a process of setting a first exposure time.
Figure 15:
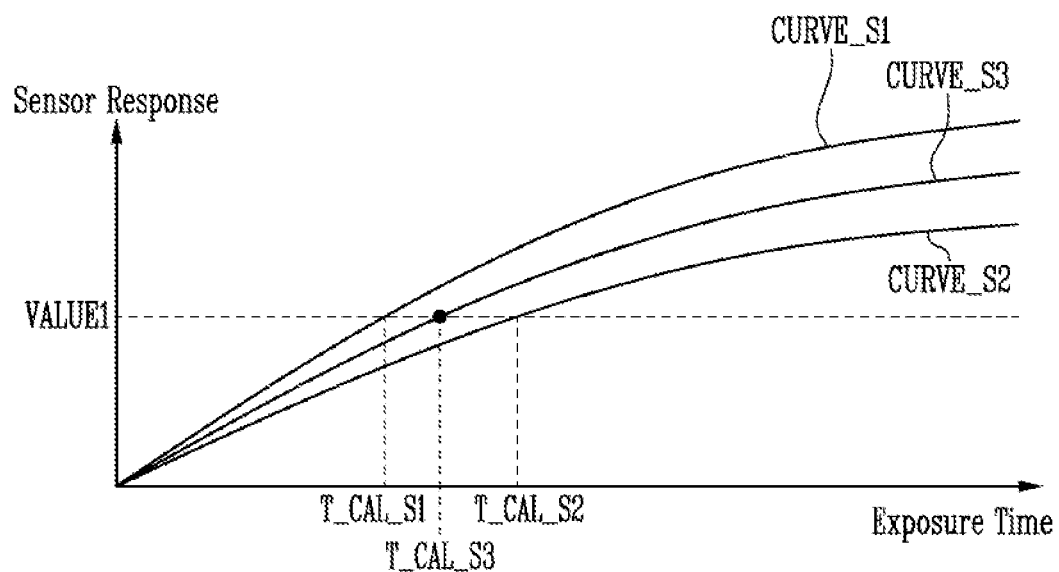
FIG. 15 illustrates an embodiment of a process of setting a first exposure time.

FIGS. 13 and 14 are flowcharts illustrating embodiments of a process of setting the first exposure time. In FIG. 14, the first curve CURVE1 described with reference to FIG. 9 is included to describe the process of setting the first exposure time using one test pattern (or test object). FIG. 15 is a diagram illustrating another embodiment of a process of setting the first exposure time, and includes curves corresponding to the first curve CURVE1 described with reference to FIG. 9 to describe the process of setting the first exposure time using a plurality of test patterns (or test objects).

Referring to FIGS. 1A, 1B, 3, 4, 6, 12, 13, and 14, the method of FIG. 13 may include, at S210, displaying the first fingerprint detection pattern (or the first display pattern) on the fingerprint sensing area FSA of the display panel 100. The first fingerprint detection pattern may be, for example, the same as the third fingerprint detection pattern DP3 described with reference to FIG. 7.

At S220, the method of FIG. 13 may include receiving the first sensing signal generated by the sensor pixel SPXL (or the photo sensors PS) in response to the first fingerprint detection pattern through the fingerprint detector 220. Thereafter, the method of FIG. 13 may include changing the exposure time of the one or more sensor pixels SPXL so that the first sensing signal falls within a reference range.

At S230, in an embodiment the method may determine whether the first sensing sensitivity of the sensor pixel SPXL according to the first sensing signal is greater than a first reference value VALUE_REF1 and less than a second reference value VALUE_REF2 (e.g., whether the first sensing sensitivity of the sensor pixel SPXL is within a first reference range).

At S240, when the first sensing sensitivity of the sensor pixel SPXL is less than the first reference value VALUE_REF1 or greater than the second reference value VALUE_REF2 (e.g., when the first sensing sensitivity of the sensor pixel(s) SPXL is out of the first reference range), the method may include changing the exposure time of the sensor pixel SPXL.

Then, operations S220 and S230 may be repeated, e.g., the method may include determining again whether the first sensing sensitivity of the sensor pixel SPXL is greater than the first reference value and less than the second reference value (e.g., whether the first sensing sensitivity of the sensor pixel SPXL is within the first reference range).

Referring to FIG. 14, when the exposure time of the sensor pixel SPXL has a first time value t1, the first sensing sensitivity of the sensor pixel SPXL may, for example, be less than the first reference value VALUE_REF1. In this case, the method of FIG. 13 may include increasing the exposure time of the one or more sensor pixels SPXL. When the exposure time of the sensor pixel(s) SPXL has a second time value t2, the first sensing sensitivity of the sensor pixel SPXL may be greater than the second reference value VALUE_REF2. In this case, the method of FIG. 13 may include decreasing the exposure time of the sensor pixel SPXL.

The process of increasing or decreasing the exposure time of the sensor pixel SPXL may be repeatedly performed until the first sensing sensitivity of the sensor pixel SPXL is greater than the first reference value VALUE_REF1 and less than the second reference value VALUE_REF2 (e.g., until the first sensing sensitivity of the sensor pixel SPXL is within the first reference range).

At S250, when the first sensing sensitivity of the sensor pixel SPXL is greater than the first reference value VALUE_REF1 and less than the second reference value VALUE_REF2 (e.g., when the first sensing sensitivity of the sensor pixel SPXL is within the first reference range), the method may include setting the corresponding exposure time to the first exposure time T_CAL1 of the sensor pixel SPXL.

According to an embodiment, the method of FIG. 13 may include setting the first exposure time T_CAL1 of the one or more sensor pixels SPXL using a plurality of test objects. For example, the test object used in FIG. 14 may have a specific skin color and may have a specific reflectance for a fingerprint detection pattern. Also, in some cases the test objects used in FIG. 15 may have substantially the same size (e.g., the size that contacts the entire (or a predetermined amount of) fingerprint sensing area FSA) and/or may have different colors. For example, the test objects may have white (or, relatively bright color), black (or, relatively dark color) and light orange color, and may have different reflectivity for the fingerprint detection pattern according to the colors. Since each user has a different skin color and because reflectance of light may be different according to the skin color, the first exposure time T_CAL1 of the sensor pixel SPXL may be set using test objects having different colors.

For example, referring to FIG. 15, when a first sub-curve CURVE_S1 represents the sensing sensitivity of a sensor pixel SPXL for a white test object and the exposure time of the sensor pixel SPXL is a first sub-exposure time T_CAL_S1, the sensing sensitivity of the sensor pixel SPXL may have a first value VALUE1 (e.g., a sensing value within the first reference range described with reference to FIG. 14). When a second sub-curve CURVE_S2 represents the sensing sensitivity of the sensor pixel SPXL for a black test object and the exposure time of the sensor pixel SPXL is a second sub-exposure time T_CAL_S2, the sensing sensitivity of the sensor pixel SPXL may have the first value VALUE1. When a third sub-curve CURVE_S3 represents the sensing sensitivity of the light orange sensor pixel SPXL for a light-orange test object and the exposure time of the sensor pixel SPXL is a third sub-exposure time T_CAL_S3, the sensing sensitivity of the sensor pixel SPXL may have the first value VALUE1.

According to an embodiment, the first to third sub-exposure times T_CAL_S1 to T_CAL_S3 may be included in the first exposure time T_CAL1. When the color of the target object (e.g., user's skin color) is estimated through the display device 1000, the display device 1000 may apply the sub-exposure time more suitable for the color of the target object as the first exposure time. For example, when skin color is relatively bright, the display device 1000 may use the first sub-exposure time T_CAL_S1 as the first exposure time T_CAL1 for detecting the fingerprint of the user. In one example, when skin color is relatively dark, the display device 1000 may use the second sub-exposure time T_CAL_S2 as the first exposure time T_CAL1 for detecting the fingerprint. Thus, the controller 223 may reduce exposure time for brighter colors of the target object. As a result, a more improved or optimized first exposure time T_CAL1 may be used for fingerprint detection, and the fingerprint of the user may be detected more accurately. As described above, the first exposure time T_CAL1 of the one or more sensor pixels SPXL for the first fingerprint detection pattern may be set.

Figure 16:
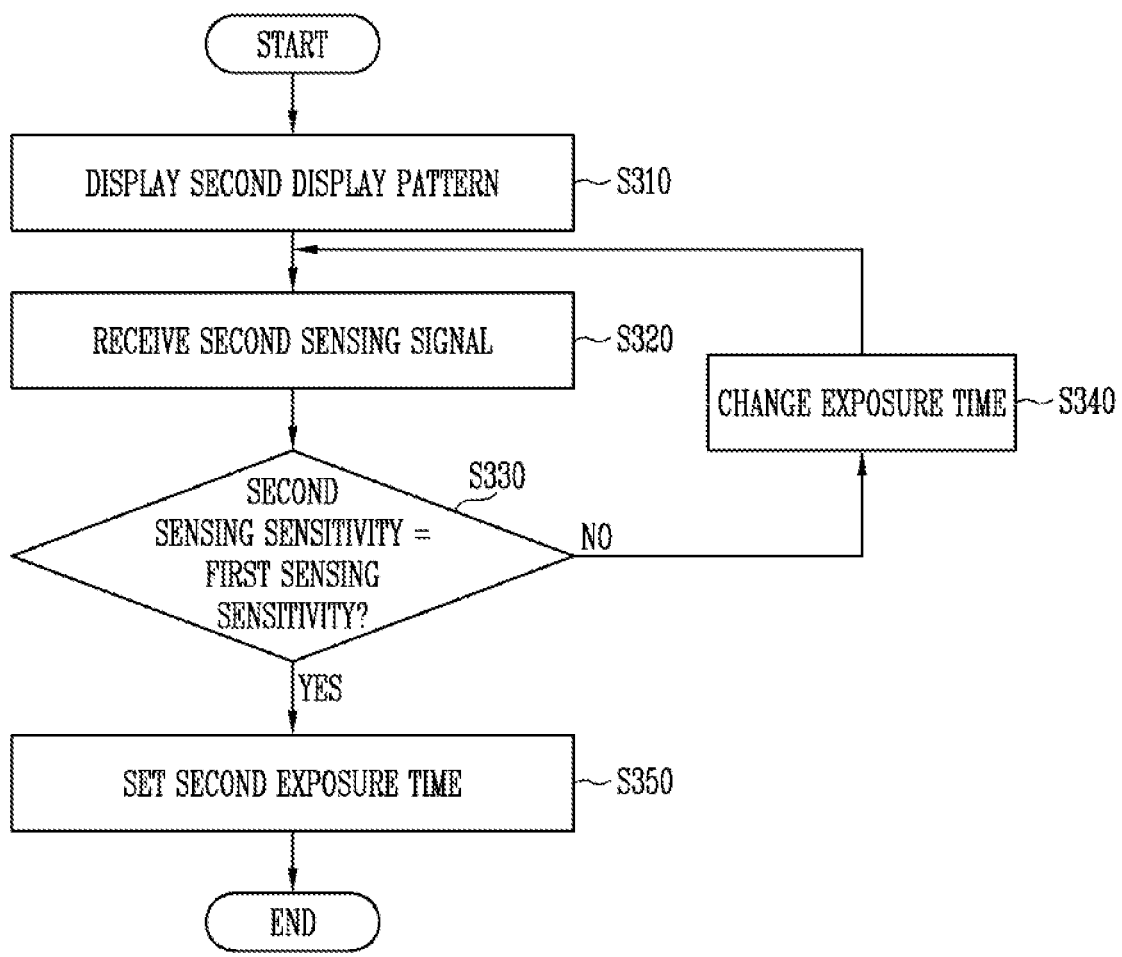
FIG. 16 illustrates an embodiment of a process of setting a second exposure time.

FIG. 16 is a flowchart illustrating an embodiment of an operation of setting the second exposure time. Referring to FIGS. 1A, 1B, 3, 4, 6, 12, and 13 to 16, the process of setting the second exposure time may be substantially the same as the process of setting the first exposure time.

The method of FIG. 16 may include, at S310, displaying the second fingerprint detection pattern (or the second display pattern) on the fingerprint sensing area FSA of the display panel 100. For example, the second fingerprint detection pattern may, for example, be the same as the first fingerprint detection pattern DP1 described with reference to FIG. 7.

At S320, the method may include receiving the second sensing signal generated by the sensor pixel SPXL (or the photo sensors PS) in response to the second fingerprint detection pattern through the fingerprint detector 220. Thereafter, the method may include changing the exposure time of the sensor pixel SPXL so that the second sensing signal falls within a reference range.

At S330, in an embodiment the method may include determining whether the second sensing sensitivity of the sensor pixel SPXL according to the second sensing signal is equal to the first sensing sensitivity (e.g., the sensing sensitivity of the sensor pixel SPXL according to the first exposure time T_CAL1 described with reference to FIG. 14).

At S340, when the second sensing sensitivity of the sensor pixel SPXL is different from the first sensing sensitivity, the method of FIG. 16 may include changing the exposure time of the sensor pixel SPXL and may determine again whether the second sensing sensitivity of the sensor pixel SPXL is equal to the first sensing sensitivity, as in operation S330. By repeating these processes, the second exposure time T_CAL2 at which the sensing sensitivity of the one or more sensors pixel SPXL is equal to the first sensing sensitivity may be set.

At S350, when the second sensing sensitivity of the sensor pixel SPXL is equal to the first sensing sensitivity, the method may include setting the corresponding exposure time as the second exposure time T_CAL2 of the sensor pixel SPXL.

According to an embodiment, as described above with reference to FIG. 15, the second exposure time T_CAL2 of the sensor pixel SPXL may be set using test objects having different colors. As described above, the second exposure time T_CAL2 of the sensor pixel SPXL for the second fingerprint detection pattern may be set.

In one embodiment, an apparatus includes a fingerprint sensor (or detector) including a sensor pixel SPXL and a controller to control driving of the sensor pixel. The fingerprint sensor and controller may correspond to the embodiments described herein. In operation, the controller is configured to set a first exposure time for the sensor pixel based on a first fingerprint detection pattern and a second exposure time for the sensor pixel based on a second fingerprint detection pattern different from the first fingerprint detection pattern. The size of the first fingerprint detection pattern is different from a size of the second fingerprint detection pattern. Also the controller is configured to change calibration data for the sensor pixel to correspond to the set exposure time.

In accordance with one or more embodiments, an input sensing device and a method of calibrating the input sensing device may change the exposure time of one or more sensor pixels based on the size of the fingerprint detection pattern (or a display pattern) displayed on the display panel corresponding to the target object. The one or more sensor pixels may be controlled to generate sensing data with substantially the same sensing sensitivity as the sensing sensitivity when generating calibration data (e.g., data for compensating deviation in the amount of light received according to positions of sensor pixels). Therefore, the input sensing device and the calibration method of the input sensing device may accurately calibrate the sensing data based on the calibration data and may more accurately detect the fingerprint of the user.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, logic, interfaces, detectors, analyzers, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, logic, interfaces, decoders, detectors, analyzers, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, generators, logic, detectors, analyzers, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

However, the effects of the present invention are not limited to the above-described effects, and may be variously extended without departing from the spirit and scope of the present invention. While the present invention has been described with reference to preferred embodiments, it will be understood by those with ordinary skill in the relevant technical field that the present invention can be variously modified and changed without departing from the spirit and scope of the present invention set forth in the appended claims. Therefore, the technical scope of the embodiments should not be limited to the detailed description of the specification, but should be determined by the appended claims. The embodiments may be combined to form additional embodiments.

What is claimed is:

1. An input sensing device, comprising:
a display panel configured to display a fingerprint detection pattern corresponding to a target object;
a sensor pixel configured to generate a sensing signal by detecting light reflected from the fingerprint detection pattern by the target object; and
a fingerprint detector configured to detect a fingerprint for the target object based on the sensing signal, wherein the fingerprint detector is configured to change an exposure time of the sensor pixel based on a size of the fingerprint detection pattern, and
wherein the fingerprint detector is configured to determine the exposure time of the sensor pixel by interpolating the first and second exposure times based on the size of the fingerprint detection pattern.

2. The input sensing device of claim 1, wherein:
the size of the fingerprint detection pattern corresponds to an area touched by the target object on the display panel, and
the fingerprint detector is configured to decrease the exposure time as the size of the fingerprint detection pattern decreases.

3. The input sensing device of claim 2, wherein:
the display panel displays the fingerprint detection pattern based on a predetermined grayscale value, and
the luminance of the fingerprint detection pattern increases as the size of the fingerprint detection pattern decreases.

4. The input sensing device of claim 2, wherein:
the fingerprint detector includes a gate driver configured to generate a scan signal, and the sensor pixel includes:
a photoelectric area configured to convert the light to charges; and
a transistor configured to output an electric signal corresponding to the charges in response to the scan signal.

5. The input sensing device of claim 4, wherein the fingerprint detector is configured to control the gate driver to change a pulse width of the scan signal based on the size of the fingerprint detection pattern.

6. The input sensing device of claim 5, wherein the fingerprint detector is configured to decrease the pulse width of the scan signal as the size of the fingerprint detection pattern decreases.

7. The input sensing device of claim 5, wherein:
the gate driver is configured to output a clock signal as the scan signal in response to a start signal, and
the fingerprint detector is configured to change an on-duty period of the clock signal based on the size of the fingerprint detection pattern.

8. The input sensing device of claim 4, wherein:
the sensor pixel includes a capacitor configured to store the charges,
the transistor is configured to output an electric signal corresponding to the charges charged in the capacitor in response to the scan signal, and
the fingerprint detector is configured to adjust a time when the scan signal is applied to the sensor pixel after the capacitor is reset.

9. The input sensing device of claim 1, wherein:
the fingerprint detector is configured to store information indicative of first and second exposure times corresponding to first and second fingerprint detection patterns having different sizes.

10. The input sensing device of claim 1, wherein the fingerprint detector is configured to:
generate sensing data by performing analog-to-digital conversion on the sensing signal,
calibrate the sensing data using preset calibration data, and
perform authentication for the target object based on the calibrated sensing data and pre-registered fingerprint data.

11. A method of calibrating an input sensing device, the calibration method comprising: setting an exposure time of a sensor pixel in a display panel based on light reflected from fingerprint detection patterns having different sizes, wherein the display panel displays the fingerprint detection patterns and the sensor pixel senses light reflected from the fingerprint detection patterns, and
wherein setting the exposure time includes:
setting a first exposure time of the sensor pixel based on a first fingerprint detection pattern having a first size,
setting a second exposure time of the sensor pixel based on a second fingerprint detection pattern having a second size, and
modeling an equation based on the first exposure time and the second exposure time according to a size of a fingerprint detection pattern.

12. The calibration method of claim 11, wherein setting the first exposure time includes:
determining whether a first sensing sensitivity of the sensor pixel to the first fingerprint detection pattern is within a reference range;
increasing or decreasing the exposure time until the first sensing sensitivity is within the reference range; and
setting the exposure time as the first exposure time when the first sensing sensitivity is within the reference range.

13. The calibration method of claim 12, wherein setting the second exposure time includes:

determining whether a second sensing sensitivity of the sensor pixel to the second fingerprint detection pattern is substantially equal to the first sensing sensitivity; and setting the second exposure time to correspond to an exposure time of the sensor pixel when the second sensing sensitivity is substantially equal to the first sensing sensitivity.

14. An apparatus, comprising:

a fingerprint sensor including a sensor pixel; and a controller to control driving of the sensor pixel, wherein the controller is configured to set a first exposure time for the sensor pixel based on a first fingerprint detection pattern and a second exposure time for the sensor pixel based on a second fingerprint detection pattern different from the first fingerprint detection pattern, and wherein the controller is configured to change calibration data for the sensor to correspond to the set exposure time.

15. The apparatus of claim 14, wherein a size of the first fingerprint detection pattern is different from a size of the second fingerprint detection pattern.

* * * * *